(12) United States Patent
Kohno et al.

(10) Patent No.: US 8,037,735 B2
(45) Date of Patent: Oct. 18, 2011

(54) DIE CUSHION APPARATUS OF PRESS MACHINE

(75) Inventors: Yasuyuki Kohno, Sagamihara (JP); Minoru Somukawa, Sagamihara (JP)

(73) Assignee: Aida Engineering, Ltd., Sagamihara-Shi, Kanagawa (JP)

( * ) Notice: Subject to any disclaimer, the term of this patent is extended or adjusted under 35 U.S.C. 154(b) by 533 days.

(21) Appl. No.: 11/914,468

(22) PCT Filed: Jan. 17, 2006

(86) PCT No.: PCT/JP2006/300507
§ 371 (c)(1),
(2), (4) Date: Nov. 15, 2007

(87) PCT Pub. No.: WO2006/123452
PCT Pub. Date: Nov. 23, 2006

(65) Prior Publication Data
US 2009/0071218 A1 Mar. 19, 2009

(30) Foreign Application Priority Data
May 16, 2005 (JP) .................................. 2005-143012

(51) Int. Cl.
*B21D 24/02* (2006.01)
*B21J 9/18* (2006.01)
(52) U.S. Cl. ...................................... 72/453.13; 72/351
(58) Field of Classification Search ................... 72/28.1, 72/29.2, 453.13, 351, 20.1, 21.5, 443, 350, 72/453.05–453.07, 453.02
See application file for complete search history.

(56) References Cited

U.S. PATENT DOCUMENTS

| | | | |
|---|---|---|---|
| 3,677,048 A * | 7/1972 | Fuchs, Jr. ........................... | 72/60 |
| 5,140,895 A * | 8/1992 | Imanishi ..................... | 72/453.15 |
| 5,237,916 A * | 8/1993 | Malashenko ............. | 100/269.14 |
| 5,299,444 A * | 4/1994 | Kirii et al. ................... | 72/453.13 |
| 5,339,665 A * | 8/1994 | Yoshikawa ..................... | 72/20.1 |
| 5,435,166 A * | 7/1995 | Sunada ........................... | 72/351 |
| 6,085,520 A * | 7/2000 | Kohno ............................ | 60/414 |
| 6,205,828 B1* | 3/2001 | Nagao et al. ......................... | 72/4 |
| 7,197,910 B2* | 4/2007 | Kodani ...................... | 72/453.13 |

FOREIGN PATENT DOCUMENTS

| | | |
|---|---|---|
| JP | 63-248522 A | 10/1988 |
| JP | 4-371326 A | 12/1992 |
| JP | 5-7945 A | 1/1993 |
| JP | 6-543 A | 1/1994 |
| JP | 7-24600 A | 1/1995 |
| JP | 8-215899 A | 8/1996 |
| JP | 10-166199 A | 6/1998 |
| JP | 11-226794 A | 8/1999 |
| JP | 2004-100810 A | 4/2004 |

* cited by examiner

*Primary Examiner* — Edward Tolan
*Assistant Examiner* — Pradeep C Battula
(74) *Attorney, Agent, or Firm* — McDermott Will & Emery LLP

(57) ABSTRACT

A die cushion apparatus of a press machine in which a discharge opening of a fluid hydraulic pump/motor is directly connected to a pressure chamber on a cushion pressure production side of a fluid hydraulic cylinder and the torque of a rotating shaft of the fluid hydraulic pump/motor is controlled by an electric motor to control a pressure (die cushion pressure) of the pressure chamber on the cushion pressure production side. It is therefore possible to control the die cushion pressure with excellent responsiveness with respect to a die cushion pressure command and prevent occurrence of a surge pressure. The die cushion apparatus also has excellent energy efficiency since energy required for a die cushioning action that a cushion pad receives when effecting die cushioning of a press machine is regenerated as electrical energy through the fluid hydraulic cylinder, fluid hydraulic pump/motor, and electric motor.

26 Claims, 21 Drawing Sheets

DIE CUSHION APPARATUS OF PRESS MACHINE

CROSS-REFERENCE TO PRIOR APPLICATION

This is a U.S. National Phase Application under 35 U.S.C. §371 of International Patent Application No. PCT/JP2006/300507 filed Jan. 17, 2006, and claims the benefit of Japanese Patent Application No. 2005-143012, filed May 16, 2005, both of which are incorporated by reference herein. The International Application was published in Japanese on Nov. 23, 2006 as WO2006/123452 A1 under PCT Article 21(2).

TECHNICAL FIELD

The present invention relates to a die cushion apparatus of a press machine, and more particularly to technology that enables control of a surge pressure and servo control of a die cushion pressure at the start of press forming by a press machine.

BACKGROUND ART (a) Pneumatic Die Cushion Apparatus

A pneumatic die cushion apparatus is constructed by connecting a pneumatic cylinder that supports a cushion pad and a steel cylinder in which a low pneumatic pressure is accumulated. A pneumatic die cushion apparatus has advantages including convenience and that fact that a surge pressure does not occur since it uses a compressible fluid.

On the other hand, there are disadvantages such as a problem that the size of the apparatus increases due to the need to provide a pit accompanying upsizing of pneumatic cylinders, performance problems such as vibrations upon collision accompanying pressure fluctuations in the compressible fluid or dumping deficiencies, and a problem that additional mechanisms are required in order to overcome a lack of knock-out operation controllability (e.g. an additional mechanism is required when locking a cylinder at the bottom dead center of a press). Accompanying the recent technological advances in the press industry, this may be called an old-style die cushion apparatus.

(b) Oil Hydraulic (Servo) Die Cushion Apparatus

A die cushion apparatus of a press has been proposed that comprises an NC servo valve that obtains a cushioning action by controlling the pressure of cushion cylinders of a cushion pad, and a positional control servo valve that executes pre-acceleration, auxiliary lifting, locking, and lifting of a cushion pad by controlling the pressure oil that is supplied to an upper chamber and a lower chamber of an oil hydraulic cylinder that supports the die cushion pad (Patent Document 1).

This die cushion apparatus can control a surge pressure by pre-accelerating the cushion pad.

(c) Electric (Servo) Type Die Cushion Apparatus

Patent Documents 2 and 3 disclose die cushion apparatuses of presses that control a pressing force for a cushion pad with an electric (servo) motor and screw and nut mechanism, link mechanism, or rack and pinion mechanism.

An advantage mentioned is that control of the pressing force is facilitated since the cushion pad is driven via an electric (servo) motor with good responsivity and (in comparison to hydraulic oil or the like) a mechanism with high rigidity (no loss of responsivity).

(d) Regarding Other Similar and Often Seen Apparatuses

Patent Document 4 discloses a plastic working device according to a hydraulic drive system that, although not a die cushion apparatus, is close thereto with respect to the outward configuration.

This plastic working device according to a hydraulic drive system has a closed combination circuit that is formed by connecting a two-way operation type oil hydraulic cylinder and a two-way discharge type hydraulic pump in a one-to-one condition without mounting a valve therebetween. The plastic working device is configured to drive the oil hydraulic cylinder via the hydraulic pump by driving the hydraulic pump using a direct current servo motor, and to subject a plate material to plastic working using a punch that is driven by the oil hydraulic cylinder.

Patent Document 1: Japanese Patent Application Laid-Open No. 7-24600
Patent Document 2: Japanese Patent Application Laid-Open No. 5-7945
Patent Document 3: Japanese Patent Application Laid-Open No. 6-543
Patent Document 4: Japanese Patent Application Laid-Open No. 10-166199

DISCLOSURE OF THE INVENTION

However, the die cushion apparatus described in Patent Document 1 has the following drawbacks.

The first drawback is that since pressure is generated by squeezing an oil flow, all the energy that is consumed in the die cushioning action is converted to heat. From an environmental perspective, this can be considered a waste of energy. Further, a cooling function (cooling apparatus) that is proportional to the capability of the device is necessary to cool the heat. The same applies for all types of hydraulic devices.

The second drawback is that when attempting to control the surge pressure at a collision time after pre-accelerating the cushion pad, there is a problem that the (effective) stroke amount at the time of a die cushion pressure action decreases.

The third drawback is that the die cushion pressure is generated by controlling an oil amount discharged from a pressure chamber on the cushion pressure production side of an oil hydraulic cylinder that is pressed by a press slide (pressure generated using the energy of the press), and is not a pressure that is generated by the die cushion apparatus itself. Accordingly, it is difficult to maintain pressure in a halt state at the bottom dead center (functional constraint).

The following points may be mentioned as drawbacks of the die cushion apparatuses of the presses according to Patent Document 2 and 3.

First drawback: Since the construction is highly rigid, an impact (impact force) at a collision is also increased by the hydraulic system and acts easily, and can lead to structural damage or damage to the die. Pre-acceleration (to thereby cause a reduction in relative speed at time of collision) is indispensable to avoid this, and in this case, it is necessary to reduce the die cushion effective stroke amount or the like, which also affects the die structure.

Second drawback: When supporting a cushion pad with a screw or rack mechanism or the like with respect to an oil hydraulic cylinder in the case of a hydraulic system, for reasons relating to ensuring strength, the dimensions in the longitudinal direction of the mechanism increase (it is thus difficult to make the device compact) and in some cases a pit is required for storage.

Further, the plastic working device according to a hydraulic drive system disclosed in Patent Document 4 is a device that, in theory, discharges a flow amount by causing a hydraulic pump to effect a hydraulic pump action with the motive power of an electric motor, and displaces an oil hydraulic cylinder with the flow amount to cause it to operate, and is thus neither a die cushion apparatus nor an apparatus that controls a die cushion pressure. Accordingly, it cannot obtain a regenerative action that recovers as electrical energy the energy that is required for die cushioning action that a cushion pad receives when die cushioning of a press machine is effected.

Further, a controller for movement control described in Patent Document 4 drives a servo motor based on a position command signal and a positional signal of a punch that is detected by a linear scale, and the main object of control is position (or speed). As a result, a pressure that opposes a molding force during plastic working is one that is two-dimensionally generated and, at the least, the pressure is not made a control object.

The present invention has been achieved in view of the above-described circumstances, and has as its object the provision of a die cushion apparatus of a press machine that can overcome the drawbacks of the above-described (b) hydraulic die cushion apparatus and (c) electric servo type die cushion apparatus and integrate only the advantages of these, can favorably control a surge pressure without pre-acceleration in an energy efficient manner, and which is excellent with respect to responsiveness to die cushion pressure commands, pressure controllability at bottom dead center, and operational controllability with respect to knock-out positions.

In order to attain the above-described object, a die cushion apparatus of a press machine according to a first aspect of the present invention comprises: a hydraulic cylinder that supports a cushion pad; a pressure detector that detects a pressure of a pressure chamber on a cushion pressure production side of the fluid hydraulic cylinder; a hydraulic pump/motor in which a discharge opening is connected via a first pipe to the pressure chamber on the cushion pressure production side of the fluid hydraulic cylinder; an electric motor that is connected to a rotating shaft of the fluid hydraulic pump/motor; a die cushion pressure command device that outputs a die cushion pressure command that is previously set; a control device that controls a torque of the electric motor so that a die cushion pressure is a pressure that corresponds to the die cushion pressure command based on the die cushion pressure command and a pressure that is detected by the pressure detector; and a regeneration device that regenerates energy required for a die cushioning action that the cushion pad receives when die cushioning of a press machine is effected as electrical energy through the fluid hydraulic cylinder, the fluid hydraulic pump/motor and the electric motor.

More specifically, a discharge opening of a fluid hydraulic pump/motor is directly connected to a pressure chamber on a cushion pressure production side of a fluid hydraulic cylinder that supports a cushion pad, and by effecting torque control of an electric motor that is connected directly or through a reduction gear to a rotating shaft of the fluid hydraulic pump/motor, the pressure (die cushion pressure) of the pressure chamber on the cushion pressure production side of the fluid hydraulic cylinder can be arbitrarily controlled. Further, by performing torque control of the electric motor with good responsivity it is possible to control a surge pressure and enable control with excellent responsiveness with respect to a die cushion pressure command. Furthermore, the die cushion apparatus has excellent energy efficiency since energy that is required for a die cushioning action that a cushion pad receives when die cushioning of the press machine is effected is regenerated as electrical energy through the fluid hydraulic cylinder, the fluid hydraulic pump/motor and the electric motor. In this connection, since a heat generation amount produced by a regenerating action is limited to a mechanical resistance amount, a cooling apparatus is not required. Further, since the main components are a fluid hydraulic cylinder, a fluid hydraulic pump/motor, and an electric motor and there are few subcomponent-like hydraulic parts, in comparison to, for example, a conventional hydraulic pressure (control) type die cushion apparatus, significant miniaturization and cost reductions can be achieved.

A die cushion apparatus of a press machine according to a second aspect of the present invention is in accordance with the first aspect of the present invention, wherein a plurality of fluid hydraulic cylinders that support the cushion pad are provided, and pressure chambers on a cushion pressure production side of each fluid hydraulic cylinder are commonly connected to the first pipe.

A die cushion apparatus of a press machine according to a third aspect of the present invention is in accordance with the first or second aspect of the present invention, wherein a plurality of sets of the fluid hydraulic pump/motor and the electric motor are provided, and discharge openings of the plurality of fluid hydraulic pump/motors are commonly connected, respectively, to the first pipe.

A die cushion apparatus of a press machine according to a fourth aspect of the present invention comprises a plurality of fluid hydraulic cylinders that support a cushion pad; a plurality of pressure detectors that detect a pressure of a pressure chamber on a cushion pressure production side of each fluid hydraulic cylinder, respectively; a plurality of fluid hydraulic pump/motors in which a discharge opening is connected through a first pipe to a pressure chamber on the cushion pressure production side of each fluid hydraulic cylinder; a plurality of electric motors that are connected to a rotating shaft of each fluid hydraulic pump/motor, respectively; a die cushion pressure command device that outputs a die cushion pressure command that is previously set; a control device that controls a torque of each electric motor so that a die cushion pressure is a pressure that corresponds to the die cushion pressure command based on the die cushion pressure command and pressures that are detected by the plurality of pressure detectors; and a regeneration device that regenerates energy required for a die cushioning action that the cushion pad receives when die cushioning of a press machine is effected as electrical energy through the plurality of fluid hydraulic cylinders, fluid hydraulic pump/motors and electric motors.

According to this die cushion apparatus, a plurality of fluid hydraulic cylinders can be individually controlled, and therefore even when an eccentric load is applied to the cushion pad, a die cushion pressure can be generated that is in accordance with that eccentric load.

A die cushion apparatus of a press machine according to a fifth aspect of the present invention is in accordance with any one of the first to fourth aspects, wherein an other discharge opening of the fluid hydraulic pump/motor is connected to a pressure chamber on a descent side of the fluid hydraulic cylinder through a second pipe, and the second pipe is connected with an accumulator that is filled with a liquid of a substantially constant low pressure. It is therefore possible to pre-pressurize a pressure chamber on the cushion pressure production side of the fluid hydraulic cylinder and a pressure chamber on a descent side thereof with a liquid of a substantially constant low pressure, to facilitate pressurization of a pressure chamber on the cushion pressure production side of the fluid hydraulic cylinder.

A die cushion apparatus of a press machine according to a sixth aspect of the present invention is in accordance with any one of the first to fourth aspects, wherein an other discharge opening of the fluid hydraulic pump/motor is connected to a tank through a second pipe.

A die cushion apparatus of a press machine according to a seventh aspect of the present invention is in accordance with any one of the first to fourth aspects, wherein an other discharge opening of the fluid hydraulic pump/motor is connected to a pressure chamber on a descent side of the fluid hydraulic cylinder through a second pipe without directly communicating with a substantially constant low pressure source comprising a tank or an accumulator. As a result, downward control of the fluid hydraulic cylinder (cushion pad) is enabled, and a raising operation (knockout operation) can also be stabilized.

A die cushion apparatus of a press machine according to an eighth aspect of the present invention is in accordance with any one of the first to sixth aspects, wherein a relief valve is connected to the first pipe such that an abnormal pressure that is generated in a pressure chamber on the cushion pressure production side of the fluid hydraulic cylinder is released through the relief valve.

A die cushion apparatus of a press machine according to a ninth aspect of the present invention is in accordance with the seventh aspect, wherein two check valves are provided in mutually opposite directions in a third pipe that connects a first pipe that is connected to a pressure chamber on the cushion pressure production side of the fluid hydraulic cylinder and a second pipe that is connected to a pressure chamber on a descent side of the fluid hydraulic cylinder, and a relief valve is connected to the third pipe between the relevant two check valves such that an abnormal pressure that is generated in a pressure chamber on the cushion pressure production side or a pressure chamber on a descent side of the fluid hydraulic cylinder is released through the relief valve. It is thereby possible to release an abnormal pressure that is generated in either a pressure chamber on the cushion pressure production side or a pressure chamber on a descent side of the fluid hydraulic cylinder using a single relief valve.

A die cushion apparatus of a press machine according to a tenth aspect of the present invention is in accordance with the eighth or ninth aspect, further comprising an accumulator that is filled with a liquid of a substantially constant low pressure, wherein the accumulator is connected to a low pressure line of the relief valve and also connected to a pressure chamber on the cushion pressure production side or two pressure chambers of the fluid hydraulic cylinder through a check valve or a pilot-opening type check valve.

A die cushion apparatus of a press machine according to an eleventh aspect of the present invention is in accordance with the eighth or ninth aspect, further comprising a tank that is connected to a low pressure line of the relief valve, wherein a low pressure liquid is discharged with a hydraulic pump from the tank through the check valve or the pilot-opening type check valve to two pressure chambers or a pressure chamber on the cushion pressure production side of the fluid hydraulic cylinder.

A die cushion apparatus of a press machine according to a twelfth aspect of the present invention is in accordance with any one of the first to eleventh aspects, further comprising an angular velocity detector for detecting a rotational angular velocity of the electric motor, wherein the control device uses an angular velocity signal that is detected by the angular velocity detector as an angular velocity feedback signal for ensuring the dynamic stability of a die cushion pressure.

A die cushion apparatus of a press machine according to a thirteenth aspect of the present invention is in accordance with any one of the first to twelfth aspects, further comprising a die cushion position detector that detects a position of the cushion pad, wherein the control device uses a die cushion position signal that is detected by the die cushion position detector as a position feedback signal in a case in which a fluid hydraulic cylinder is raised or lowered alone or when performing a product knockout operation.

A die cushion apparatus of a press machine according to a fourteenth aspect of the present invention is in accordance with any one of the first to thirteenth aspects, further comprising a slide position detector that detects a slide position of a press machine or an angle detector that detects the angle of a drive shaft of a press machine, wherein the die cushion pressure command device outputs a die cushion pressure command based on a slide position signal that is detected by the slide position detector or an angle signal that is detected by the angle detector.

A die cushion apparatus of a press machine according to a fifteenth aspect of the present invention is in accordance with any one of the first to fourteenth aspects, further comprising a slide speed detector that detects a sliding speed of the press machine or an angular velocity detector that detects an angular velocity of a drive shaft of the press machine, wherein the control device uses a slide speed signal that is detected by the slide speed detector or an angular velocity signal that is detected by the angular velocity detector in compensation for ensuring dynamic stability in die cushion pressure control.

According to the present invention, a discharge opening of a fluid hydraulic pump/motor is directly connected to a pressure chamber on a cushion pressure production side of a fluid hydraulic cylinder, and the torque of a rotating shaft of the fluid hydraulic pump/motor is controlled by an electric motor to control the pressure (die cushion pressure) of the pressure chamber on the cushion pressure production side. It is therefore possible to control the die cushion pressure with excellent responsiveness with respect to die cushion pressure commands and to prevent the occurrence of a surge pressure. Further, the die cushion apparatus has excellent energy efficiency because energy that is required for a die cushioning action that a cushion pad receives when die cushioning of the press machine is effected is regenerated as electrical energy through the fluid hydraulic cylinder, fluid hydraulic pump/motor, and electric motor.

DESCRIPTION OF SYMBOLS

Figure 1:
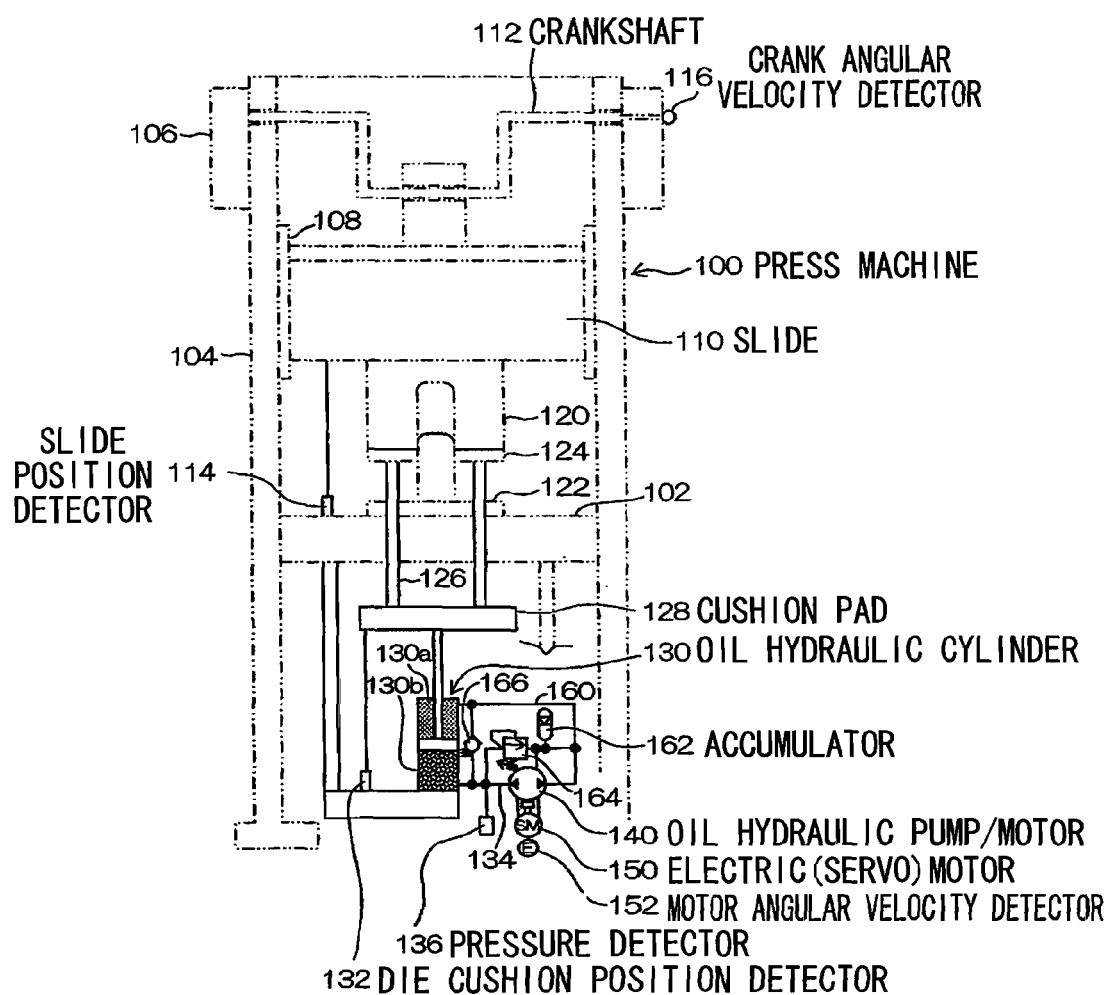
FIG. 1 is a configuration diagram that illustrates a first embodiment of a die cushion apparatus of a press machine according to the present invention.

100 . . . press machine
110 . . . slide
114 . . . slide position detector
114' . . . crank angle detector
116 . . . crank angular velocity detector
120 . . . upper die
122 . . . lower die
124 . . . crease pressing plate
126 . . . cushion pin
128 . . . cushion pad
130, 230, 232, 234, 330, 332, 334 . . . oil hydraulic cylinder
132 . . . die cushion position detector
134, 160, 202, 204, 220, 222 . . . piping
136, 136a, 136b . . . pressure detector
140, 140a, 140b, 140c, 140d . . . oil hydraulic pump/motor
150, 150a, 150b, 150c, 150d . . . electric (servo) motor
152, 152a, 152b, 152c, 152d . . . motor angular velocity detector
162, 262 . . . accumulator
164, 216, 216a, 216b . . . relief valve
166, 214, 214a, 214b, 266a, 266b, 274a, 274b . . . check valve
170, 170a, 170b, 170c . . . die cushion pressure and position controller
172, 172a, 172b, 172c, 172d . . . amplifier and PWM controller 174 . . . alternating-current power supply
176 . . . direct-current power supply device with power regeneration function
180, 182, 182a, 182b, 182c . . . die cushion pressure controller
200 . . . tank
210 . . . electric (induction) motor
212, 212a, 212b . . . oil hydraulic pump
280, 280a, 280b . . . pressure source

BEST MODE FOR CARRYING OUT THE INVENTION

Hereunder, preferable embodiments of a die cushion apparatus of a press machine according to the present invention will be described in detail in accordance with the attached drawings.

Configuration of Die Cushion Apparatus (First Embodiment)

FIG. 1 is a configuration diagram that illustrates a first embodiment of a die cushion apparatus of a press machine according to the present invention.

In a press machine 100 shown in FIG. 1, a frame is composed by a bed 102, columns 104 and crowns 106. A slide 110 is guided in a freely movable condition in the vertical direction by guide portions 108 that are provided in the columns 104. The slide 110 is moved in the upward and downward directions in FIG. 1 by a crank mechanism including a crankshaft 112 to which a rotational driving force is transferred by unshown driving device.

On the bed 102 side of the press machine 100 is provided a slide position detector 114 that detects the position of the slide 110. A crank angular velocity detector 116 that detects the angular velocity of the crankshaft 112 is provided in the crankshaft 112.

An upper die 120 is mounted in the slide 110, and a lower die 122 is mounted (on a bolster) on the bed 102.

A crease pressing plate 124 is provided between the upper die 120 and the lower die 122. The underside thereof is supported by a cushion pad 128 through a plurality of cushion pins 126, and a material is placed (contacts) on the top side.

The die cushion apparatus principally comprises an oil hydraulic cylinder 130 that supports the aforementioned cushion pad 128, an oil hydraulic pump/motor 140, an electric (servo) motor 150, and a control apparatus, described later, and the like.

The cushion pad 128 is supported by the oil hydraulic cylinder 130. A die cushion position detector 132 that detects a position of the cushion pad 128 is disposed in the cushion pad 128 (or a section that links to the oil hydraulic cylinder and a piston).

A piping 134 that connects to a pressure chamber 130b on the cushion pressure production side (hereunder referred to as "lower chamber") of the oil hydraulic cylinder 130 is connected to a pressure detector 136 that detects the pressure of the lower chamber 130b, and is also connected to one discharge opening of an oil hydraulic pump/motor 140.

A piping 160 that connects to a pressure chamber 130a on a descent side (hereunder referred to as "upper chamber") of the oil hydraulic cylinder 130 is connected to another discharge opening of the oil hydraulic pump/motor 140, and is also connected to an accumulator 162.

Further, a relief valve 164 is connected to the piping 134 that is connected to the lower chamber 130b of the oil hydraulic cylinder 130, and a low pressure line (return line) of the relief valve 164 connects to the accumulator 162. A check valve 166 is provided on piping that connects the upper chamber 130a and the lower chamber 130b of the oil hydraulic cylinder 130.

A drive shaft of an electric motor 150 is connected directly or through a reduction gear to a rotating shaft of the oil hydraulic pump/motor 140. A motor angular velocity detector 152 for detecting the rotational angular velocity of the electric motor 150 is provided at the electric motor 150.

[Principles of Die Cushion Pressure Control]

Since the die cushion pressure can be expressed by the product of the cylinder area and pressure of the lower chamber 130b of the oil hydraulic cylinder 130, controlling the die cushion pressure device controlling the pressure of the lower chamber 130b of the oil hydraulic cylinder 130.

In this case, static behavior can be expressed by formulas (1) and (2) below, where:

Oil hydraulic cylinder and die cushion pressure generation side sectional area: A
Oil hydraulic cylinder and die cushion pressure generation side volume: V
Die cushion pressure: P
Electric (servo) motor torque: T
Moment of inertia of electric motor: I
Viscous drag coefficient of electric motor: $D_M$
Frictional torque of electric motor: $f_M$
Displacement volume of oil hydraulic pump/motor: Q
Force applied to oil hydraulic cylinder piston rod from slide: F
Pad velocity generated upon pressing by press: v
Inertial mass of pad+oil hydraulic cylinder piston rod: M
Viscous drag coefficient of oil hydraulic cylinder: $D_S$
Frictional force of oil hydraulic cylinder: $f_S$
Angular velocity of servo motor that rotates upon pushing by pressure oil: ω
Bulk modulus of hydraulic oil: K
Proportionality factor: $k_1$, $k_2$ $$P = \int K((v \cdot A - k_1 Q \cdot \omega)/V) dt \quad (1)$$

$$T = k_2 \cdot PQ/(2\pi) \quad (2)$$

Further, dynamic behavior can be expressed by formulas (3) and (4) in addition to formulas (1) and (2).

$$PA - F = M \cdot dv/dt + D_S \cdot v + f_S \quad (3)$$

$$T - k_2 PQ/(2\pi) = I \cdot d\omega/dt + D_M \cdot \omega + f_M \quad (4)$$

The force represented by the above formulas (1) to (4), that is, the force transferred to the oil hydraulic cylinder 130 through the cushion pad 128 from the slide 110, compresses the lower chamber 130b of the oil hydraulic cylinder 130 to generate the die cushion pressure. At the same time, the oil hydraulic pump/motor 140 is caused to effect an oil hydraulic motor action by the die cushion pressure and, in a state in which a rotating shaft torque that is generated at the oil hydraulic pump/motor 140 overcomes the drive torque of the electric motor 150, rotates (regenerative action) the electric motor 150 to thereby control a rise in pressure. Ultimately, the die cushion pressure is determined in accordance with the drive torque of the electric motor 150.

Control Apparatus (First Embodiment)

Figure 2:
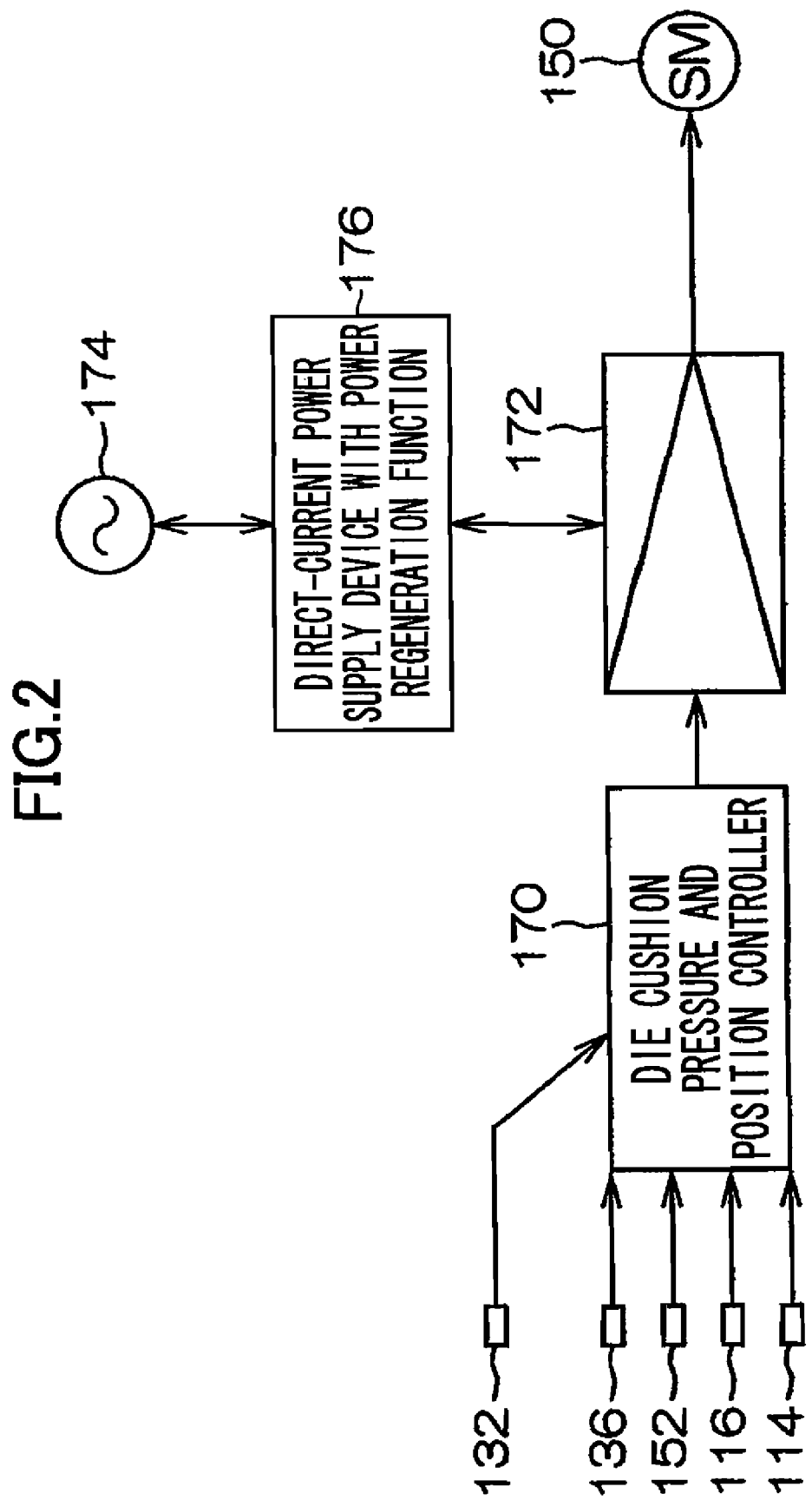
FIG. 2 is a view that illustrates a first embodiment of a control apparatus in a die cushion apparatus of a press machine according to the present invention.

FIG. 2 is a view that illustrates a first embodiment of a control apparatus in a die cushion apparatus of a press machine according to the present invention. FIG. 2 illustrates a control apparatus that is applied to the die cushion apparatus of the first embodiment.

This control apparatus chiefly comprises a die cushion pressure and position controller 170, an amplifier and PWM controller 172, an alternating-current power supply 174, and a direct-current power supply device with power regeneration function 176.

The die cushion pressure and position controller 170 respectively receives a pressure detection signal indicating a pressure P from the pressure detector 136, an angular velocity signal indicating a motor angular velocity ω from the motor angular velocity detector 152, an angular velocity signal indicating a crank angular velocity from the crank angular velocity detector 116, a position detection signal indicating a slide position from the slide position detector 114 and a position detection signal indicating a die cushion position from the die cushion position detector 132, that are shown in FIG. 1.

The die cushion pressure and position controller 170 includes a die cushion pressure command device that outputs a preset die cushion pressure command, and receives the pressure detection signal indicating the pressure P from the pressure detector 136 in order to control the die cushion pressure P in accordance with the die cushion pressure command.

The die cushion pressure and position controller 170 mainly receives the angular velocity signal indicating the motor angular velocity ω from the motor angular velocity detector 152 as an angular velocity feedback signal for ensuring the dynamic stability of the die cushion pressure, and receives the angular velocity signal indicating the crank angular velocity detected from the crank angular velocity detector 116 for use in compensation for ensuring dynamic stability in die cushion pressure control. In this connection, a configuration may also be adopted in which a slide speed signal indicating a slide speed v that is obtained by subjecting a detected positional signal from the slide position detector 114 to temporal differentiation is used in place of the crank angular velocity signal.

Further, the die cushion pressure and position controller 170 receives a slide position signal that is input from the slide position detector 114 in order to obtain the start timing of the die cushion function, and the die cushion pressure command device inside the die cushion pressure and position controller 170 outputs a corresponding die cushion pressure command on the basis of this input slide position signal. The die cushion pressure and position controller 170 also receives a position detection signal that indicates a die cushion position that is input from the die cushion position detector 132 as a position feedback signal in a case in which the oil hydraulic cylinder 130 is raised or lowered alone or when performing a product knockout operation.

Figure 3:
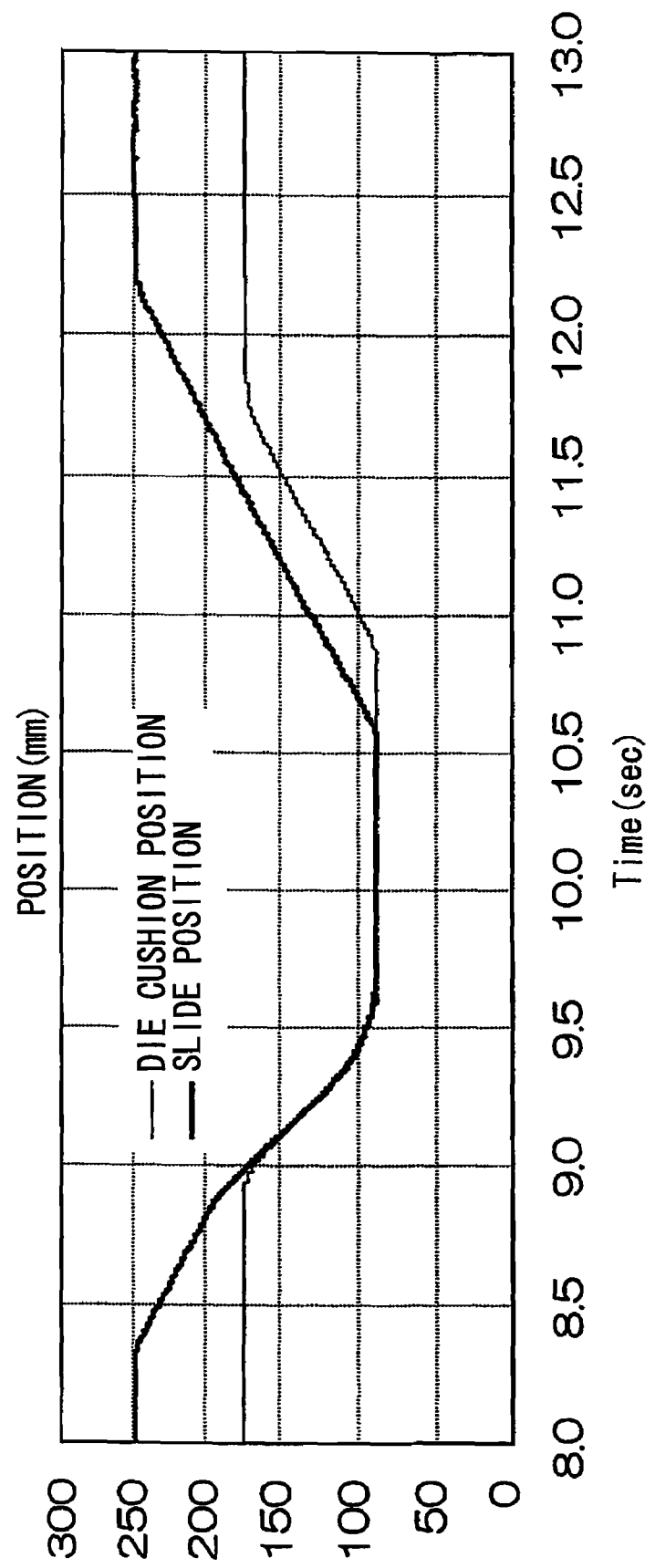
FIG. 3 is a motion diagram that illustrates changes over time in a slide position and a die cushion position.
Figure 4:
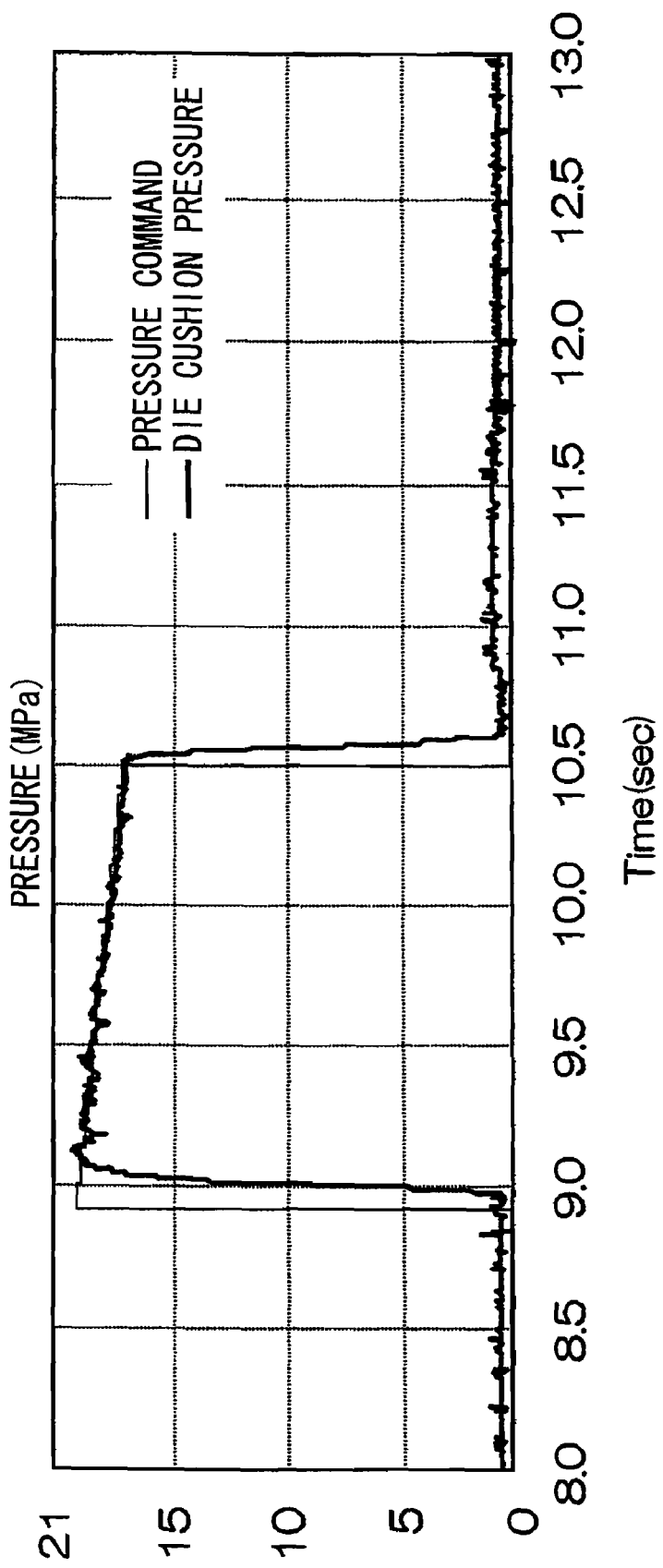
FIG. 4 is a motion diagram that illustrates changes over time in a die cushion pressure command and a die cushion pressure.

FIG. 3 is a motion diagram that illustrates changes over time in a slide position and a die cushion position. FIG. 4 is a motion diagram that illustrates changes over time in a die cushion pressure command and a die cushion pressure.

In FIG. 3, when the slide 110 is in the vicinity of the top dead center (in FIG. 3: 250 mm), the cushion pad 128 (crease pressing plate 124) is already standing by at the initial position (in FIG. 3: 180 mm). More specifically, the die cushion pressure and position controller 170 controls (holds) a position by outputting a torque command value that is calculated using a position detection signal of the die cushion position detector 132 and a standby position command value to the electric motor 150. In this state, the die cushion pressure is substantially 0 (only the amount of a pre-applied pressure acts) as shown in FIG. 4.

When the slide 110 descends and a position detection signal of the slide position detector 114 reaches the (vicinity of the) die cushion initial position, the die cushion pressure and position controller 170 switches the control from a position (holding) control state to a die cushion pressure control state. More specifically, the die cushion pressure and position controller 170 carries out die cushion pressure control by outputting a torque command value that is calculated using a die cushion pressure command value, a pressure detection signal, and a motor angular velocity signal (press velocity signal) to the electric motor 150 through the amplifier and PWM controller 172.

Further, when performing die cushion pressure control, the torque output direction of the electric motor 150 and the generated velocity are opposite at the descending time (formation time) from the time that the slide 110 collides with the material (and crease pressing plate 124) until it reaches the bottom dead center. More specifically, the motive power that is received by the cushion pad 128 from the slide 110 causes pressure oil from the lower chamber 130b of the oil hydraulic cylinder 130 to flow into the oil hydraulic pump/motor 140, whereby the oil hydraulic pump/motor 140 acts as an oil hydraulic motor. The electric motor 150 is driven by the oil hydraulic pump/motor 140 and acts as a power generator. Power that is generated by the electric motor 150 is regenerated in the alternating-current power supply 174 via the amplifier and PWM controller 172 and the direct-current power supply device with power regeneration function 176.

<Regarding Drawing>

As shown in FIG. 1, with respect to the die (upper die 120 and lower die 122) according to the present example, a die is mounted that is used for processing items having the shape of a hollow cup that is closed at the top (draw shape).

The slide 110 descends in a state in which a material (in this example, a circular plate) is placed on the crease pressing plate 124 that is standing by in a condition in which it is supported by the cushion pin 126 at a predetermined initial position. At the point in time when the upper die 120 contacts against the material, press working (drawing) of the material begins. The material undergoes plastic working between the upper die 120 and the lower die 122, and at the same time is supported from below through the cushion pin 126 and the crease pressing plate 124 with a set (pressure) force that is necessary for controlling cracks or wrinkles that are generated in the radial direction of the circular material that are liable to occur at the time of drawing. The force at this time is the die cushion pressure, and this die cushion pressure always acts during the working.

<Supplementary Description Relating to Die Cushion Function>

Generally, in the case of circular draw forming, since the area of a flat material portion decreases as the drawing progresses (cylinder lengthens), it is sufficient that the die cushion pressure is small. Using a small pressure (securing the necessary minimum pressure) improves the formability since it is difficult to break the material and the material is deeply drawn.

The reason that variability of a die cushion pressure (variable pressure) is required during a press-formation process is to improve the formability as described above.

In this connection, since a slide collides (strikes in an impacting manner) against the material (and crease pressing plate) when the working process starts, an impact force (a surge pressure in the case of an oil hydraulic cylinder) is easily generated at the die cushion and that impact force exceeds a predetermined die cushion pressure and therefore may break a molded article or damage the die and adversely affect the endurance life of the machine itself.

[Action of Die Cushion Apparatus]

As described above, in a die cushion apparatus of a press machine according to the present invention, pressure is produced in the oil hydraulic cylinder 130 by the motive power of the slide 110 through the die, the crease pressing plate 124, the cushion pin 126, and the cushion pad 128. This pressure (die cushion pressure) is controlled so as to be a die cushion pressure command value by controlling the torque of the electric motor 150 based on a die cushion pressure command and a pressure detection signal detected by the pressure detector 136. Further, when the slide 110 descends (formation time), regeneration (to the power source) of motive power is performed by the electric motor 150 that is driven by causing the oil hydraulic pump/motor 140 to act as an oil hydraulic motor using pressure oil that is discharged from the lower chamber 130b of the oil hydraulic cylinder 130.

At the time of the above described torque control of the electric motor 150, an angular velocity signal that is detected by the motor angular velocity detector 152 is used for the purpose of ensuring dynamic stability with respect to control of the die cushion pressure. A position detection signal detected by the die cushion position detector 132 is used for the purpose of (a position feedback signal in) positional control in a case in which an oil hydraulic cylinder is raised or lowered alone or when performing a product knockout operation.

In FIG. 1, the accumulator 162 is filled with a substantially constant low pressure oil of a pressure of approximately 0.5 to 1 Mpa. As well as serving the function of a tank, the accumulator 162 also fulfills the function of supplying the substantially constant low pressure oil to the lower chamber 130b of the oil hydraulic cylinder 130 through the check valve 166 to perform pre-pressurization to facilitate pressurization when performing die cushion pressure control.

The relief valve 164 is provided to prevent damage to the hydraulic equipment when an abnormal pressure occurs (when die cushion pressure control is not possible, and a sudden abnormal pressure occurs).

A position detection signal that is detected by the slide position detector 114 is used for controlling the start (start of pressure control) timing of the die cushion function. An angular velocity signal that is detected by the crank angular velocity detector 116 is used for ensuring dynamic stability in control of the die cushion pressure.

Further, a die cushion pressure command value in the case of the present example drops in a tapered shape as shown in FIG. 4. As described in the foregoing, this is because the required crease pressing force decreases in proportion to the draw-forming depth during drawing.

Control of the die cushion pressure continues during a halt after the slide 110 reaches the bottom dead center. At a time (near) when the slide 110 starts to ascend (at approximately 10.5 seconds in FIG. 3), control of the die cushion pressure ends and the control is switched to die cushion position control. According to the present embodiment, after a fixed time from when the slide 110 starts to ascend the cushion pad 128 is raised and returned to the initial position to prepare for the next cycle.

Control Apparatus (Second Embodiment)

Figure 5:
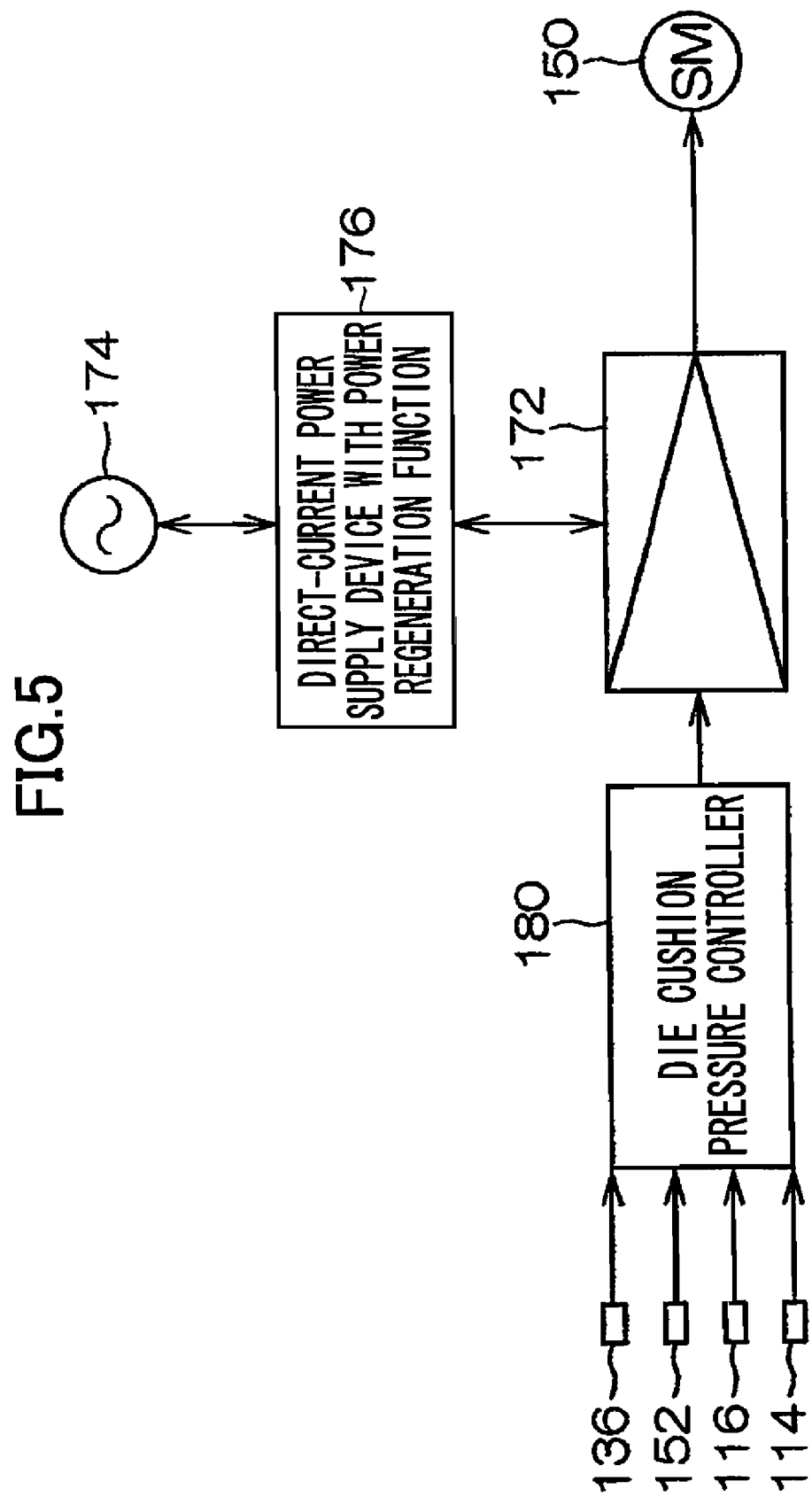
FIG. 5 is a view that illustrates a second embodiment of a control apparatus in a die cushion apparatus of a press machine according to the present invention.

FIG. 5 is a view that illustrates a second embodiment of a control apparatus for the die cushion apparatus of a press machine according to the present invention. The parts common with parts of the control apparatus according to the first embodiment as illustrated in FIG. 2 are assigned the same reference numerals and detailed explanations thereof are omitted.

In comparison to the control apparatus according to the first embodiment as illustrated in FIG. 2, the control apparatus according to the second embodiment illustrated in FIG. 5 is different in the respect that a die cushion pressure controller 180 is provided in place of the die cushion pressure and position controller 170.

The die cushion pressure controller 180 differs from the die cushion pressure and position controller 170 in the respect that a position detection signal from the die cushion position detector 132 is not input to the die cushion pressure controller 180 and the die cushion pressure controller 180 does not perform positional control of the cushion pad 128.

In this connection, the cushion pad 128 can be moved so that the cushion pad 128 stands by in a desired standby position by raising the cushion pad 128 by controlling the velocity of the electric motor 150 using the angular velocity signal to mechanically cause the cushion pad 128 to contact against an unshown stopper, and obtaining verification with a limit switch or the like.

Control Apparatus (Third Embodiment)

Figure 6:
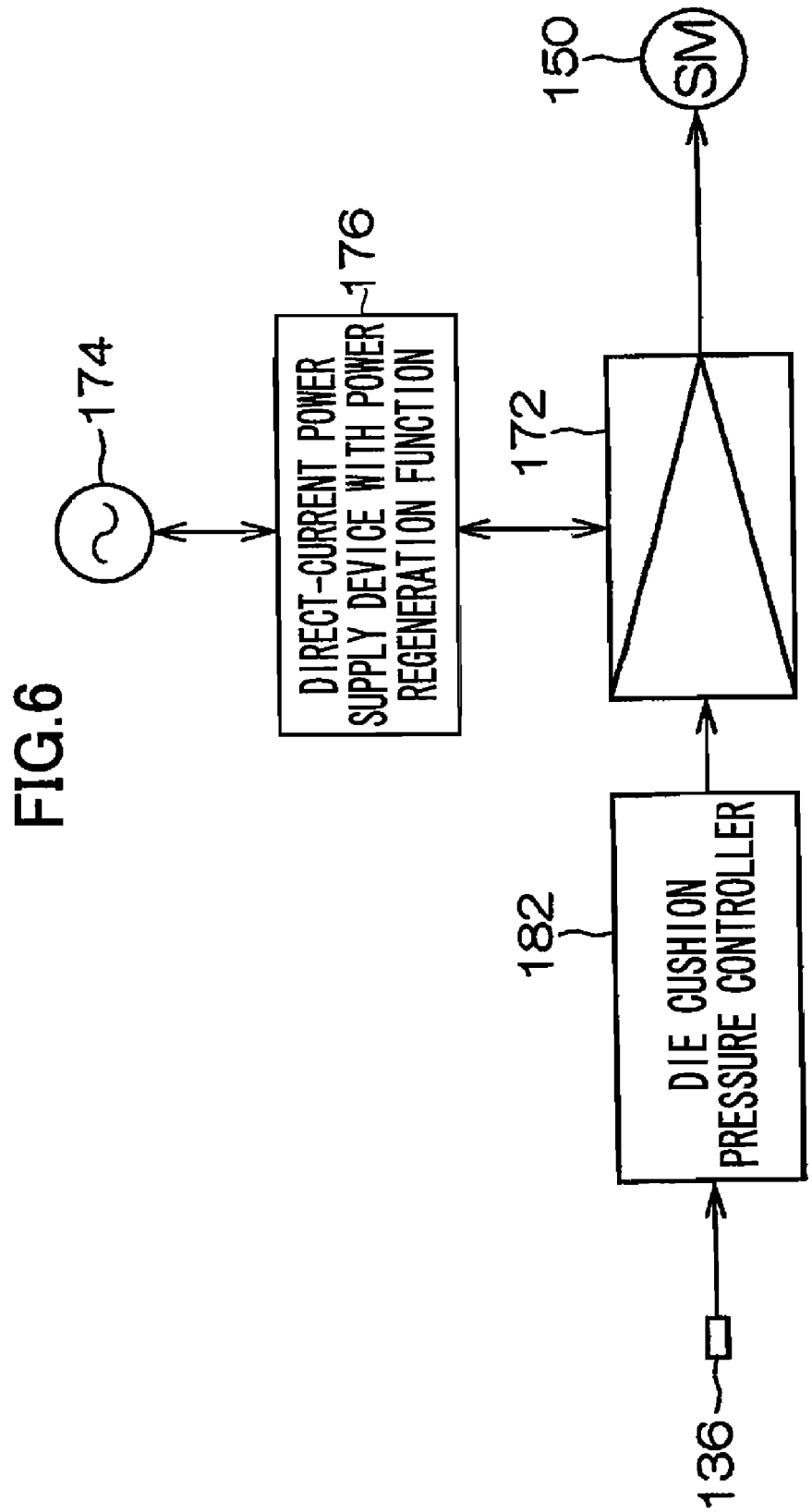
FIG. 6 is a view that illustrates a third embodiment of a control apparatus in a die cushion apparatus of a press machine according to the present invention.

FIG. 6 is a view that illustrates a third embodiment of a control apparatus for the die cushion apparatus of a press machine according to the present invention. The parts common with parts of the control apparatus according to the second embodiment as illustrated in FIG. 5 are assigned the same reference numerals and detailed explanations thereof are omitted.

In comparison to the control apparatus according to the second embodiment as illustrated in FIG. 5, the control apparatus according to the third embodiment illustrated in FIG. 6 is different in the respect that a die cushion pressure controller 182 is provided in place of the die cushion pressure controller 180.

Only a pressure detection signal that is detected by the pressure detector 136 is input to the die cushion pressure controller 182.

The die cushion pressure controller 182 conducts die cushion pressure control by outputting a torque command value that is calculated using a predetermined die cushion pressure command value (fixed value) and a pressure detection signal that is input by the pressure detector 136 to the electric motor 150 through the amplifier and PWM controller 172. In this case, the cushion pad 128 after completion of forming is raised by performing low torque control for the electric motor 150 to allow the cushion pad 128 to standby in a state in which it contacts against a stopper.

Configuration of Die Cushion Apparatus (Second Embodiment)

Figure 7:
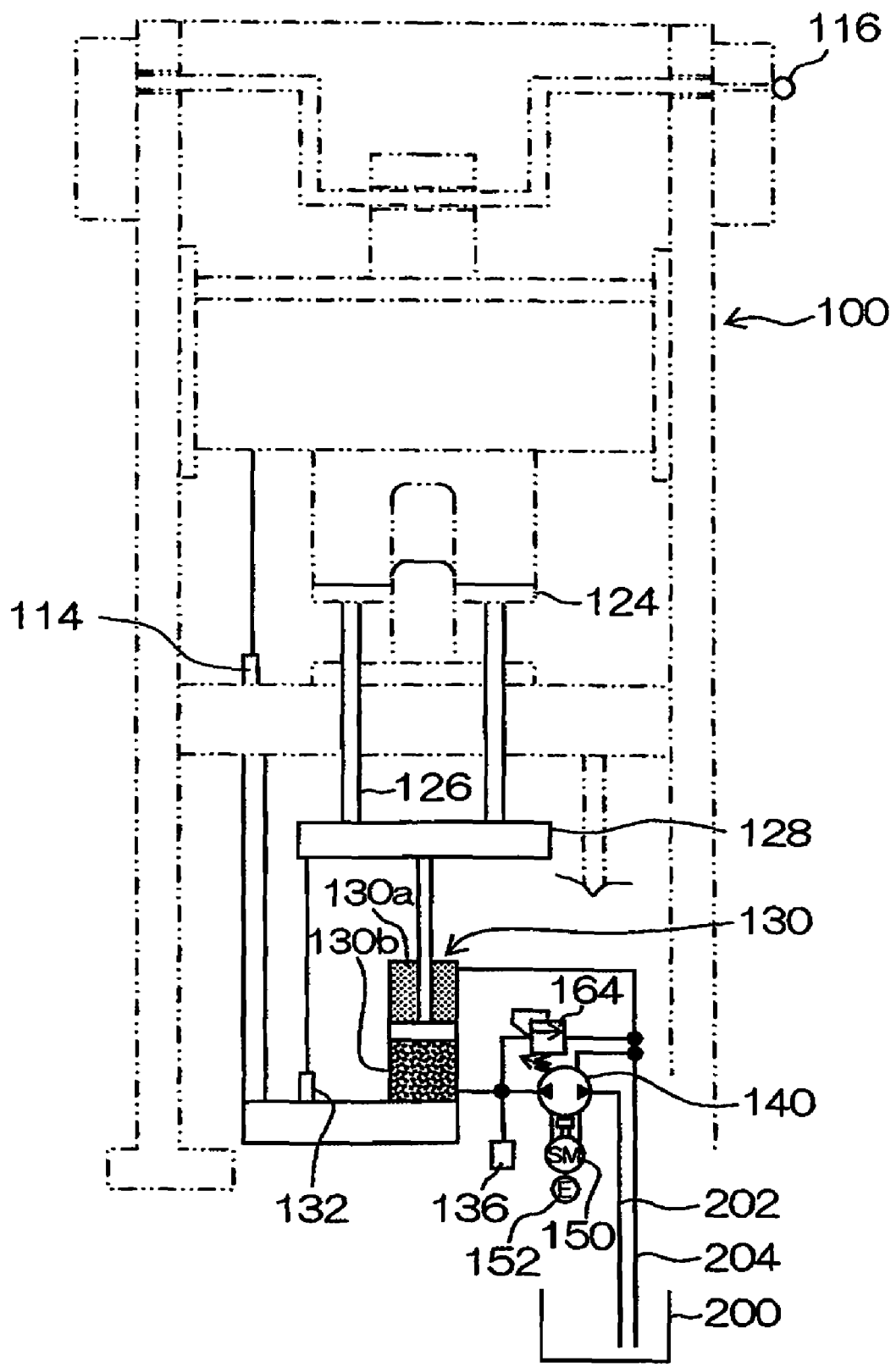
FIG. 7 is a configuration diagram that illustrates a second embodiment of the die cushion apparatus of a press machine according to the present invention.

FIG. 7 is a configuration diagram that illustrates the second embodiment of a die cushion apparatus of a press machine according to the present invention. The parts common with parts of the die cushion apparatus of the first embodiment as illustrated in FIG. 1 are assigned the same reference numerals and detailed explanations thereof are omitted.

In comparison to the die cushion apparatus of a press machine of the first embodiment as illustrated in FIG. 1, the die cushion apparatus of the second embodiment illustrated in FIG. 7 is different in the respect that a tank 200 is provided and the accumulator 162 or check valve 166 is not provided.

Another discharge opening of the oil hydraulic pump/motor 140 is connected to the tank 200 through the piping 202. Further, the upper chamber 130a of the oil hydraulic cylinder 130 and the low pressure line of the relief valve 164 connect to the tank 200 through the piping 204.

The die cushion apparatus of a press machine according to this second embodiment cannot pre-pressurize the upper chamber 130a and lower chamber 130b of the oil hydraulic cylinder 130 using a substantially constant low pressure oil.

Configuration of Die Cushion Apparatus (Third Embodiment)

Figure 8:
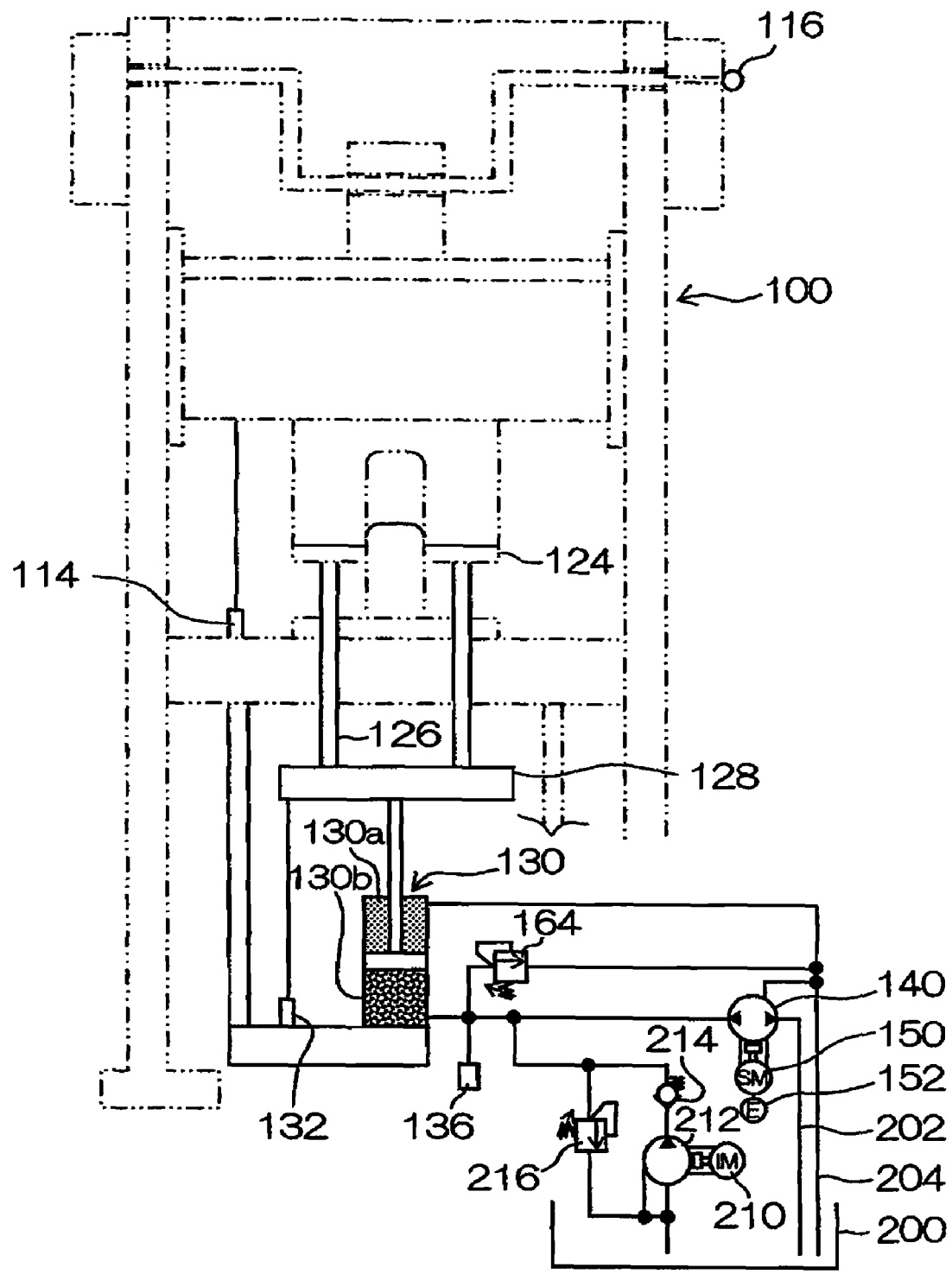
FIG. 8 is a configuration diagram that illustrates a third embodiment of the die cushion apparatus of a press machine according to the present invention.

FIG. 8 is a configuration diagram that illustrates the third embodiment of a die cushion apparatus of a press machine according to the present invention. The parts common with parts of the die cushion apparatus of the second embodiment as illustrated in FIG. 7 are assigned the same reference numerals and detailed explanations thereof are omitted.

In comparison to the die cushion apparatus of a press machine according to the second embodiment as illustrated in FIG. 7, the die cushion apparatus according to the third embodiment illustrated in FIG. 8 is different in the respect that an oil hydraulic pump 212 that is driven by an electric (induction) motor 210, a check valve 214, and a relief valve 216 are added.

A discharge opening of the oil hydraulic pump 212 is connected to the lower chamber 130b of the oil hydraulic cylinder 130 through the check valve 214. Accordingly, by driving the oil hydraulic pump 212 using the electric motor 210, pressure oil can be supplied to the lower chamber 130b of the oil hydraulic cylinder 130 by a separate system to the oil hydraulic pump/motor 140.

According to the present example, the pressure of the lower chamber 130b of the oil hydraulic cylinder 130 is kept in a low pressure state that is slightly higher than the atmospheric pressure, and thus problems such as the intake of air do not occur.

The control apparatus according to the first embodiment as shown in FIG. 2 can be applied as the control apparatus of the die cushion apparatus of the second and third embodiments that are described above.

Configuration of Die Cushion Apparatus (Fourth Embodiment)

Figure 9:
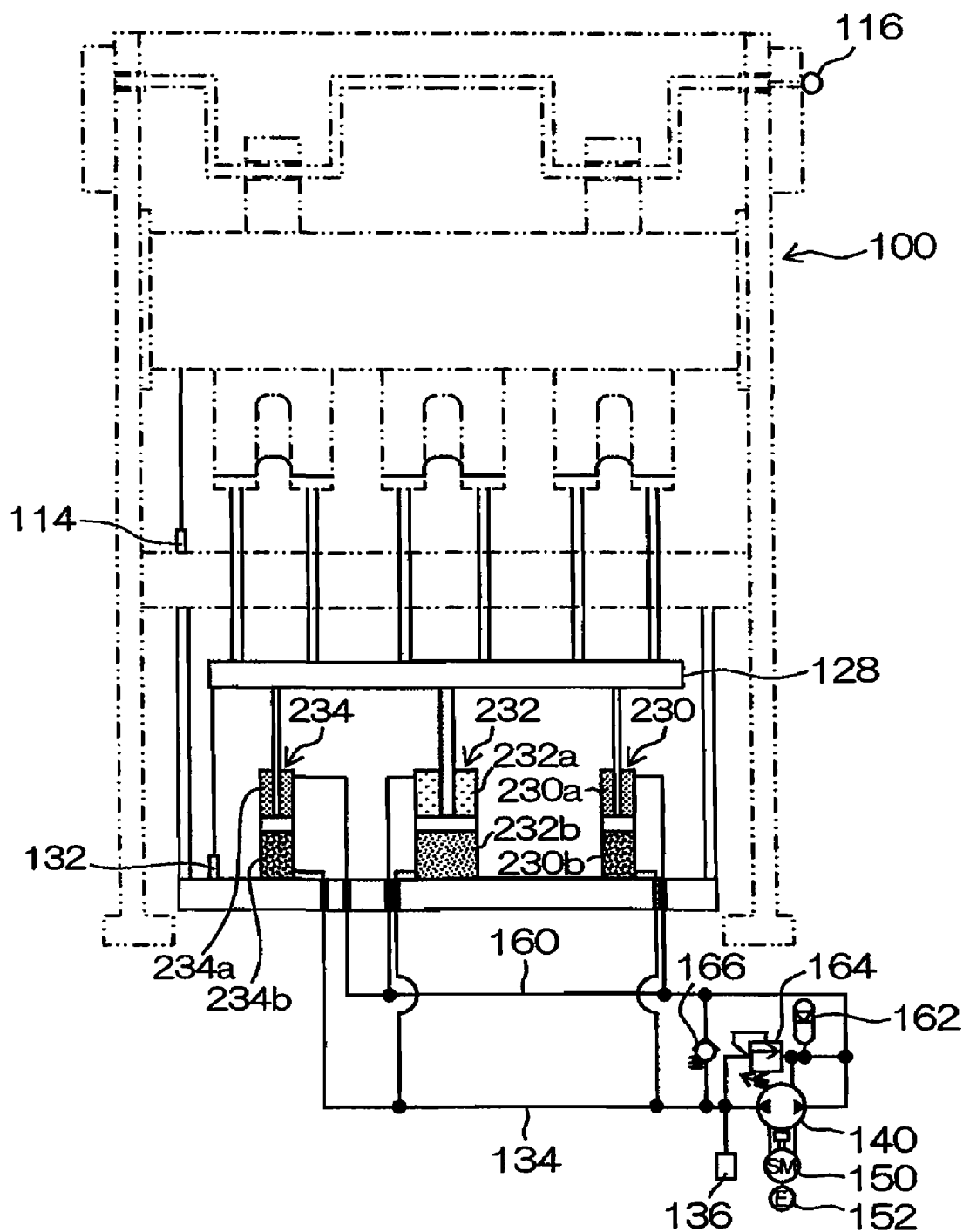
FIG. 9 is a configuration diagram that illustrates a fourth embodiment of the die cushion apparatus of a press machine according to the present invention.

FIG. 9 is a configuration diagram that illustrates the fourth embodiment of a die cushion apparatus of a press machine according to the present invention. The parts common with parts of the die cushion apparatus of the first embodiment as illustrated in FIG. 1 are assigned the same reference numerals and detailed explanations thereof are omitted.

In comparison to the die cushion apparatus of a press machine according to the first embodiment as illustrated in FIG. 1, the die cushion apparatus according to the fourth embodiment illustrated in FIG. 9 is different in the respect that the cushion pad 128 is supported by a plurality of oil hydraulic cylinders 230, 232, and 234.

The respective lower chambers 230b, 232b, and 234b of the oil hydraulic cylinders 230, 232, and 234 are commonly connected to the piping 134 that connects to one of the discharge openings of the oil hydraulic pump/motor 140. The respective upper chambers 230a, 232a, and 234a of the oil hydraulic cylinders 230, 232, and 234 are commonly connected to the piping 160 that connects to the other discharge opening (accumulator 164 side) of the oil hydraulic pump/motor 140.

By using the plurality of oil hydraulic cylinders 230, 232, and 234 in this manner, the total cylinder cross-sectional area is enlarged to enable generation of a large die cushion pressure. Further, a die cushion pressure can be uniformly applied to the cushion pad 128.

Configuration of Die Cushion Apparatus (Fifth Embodiment)

Figure 10:
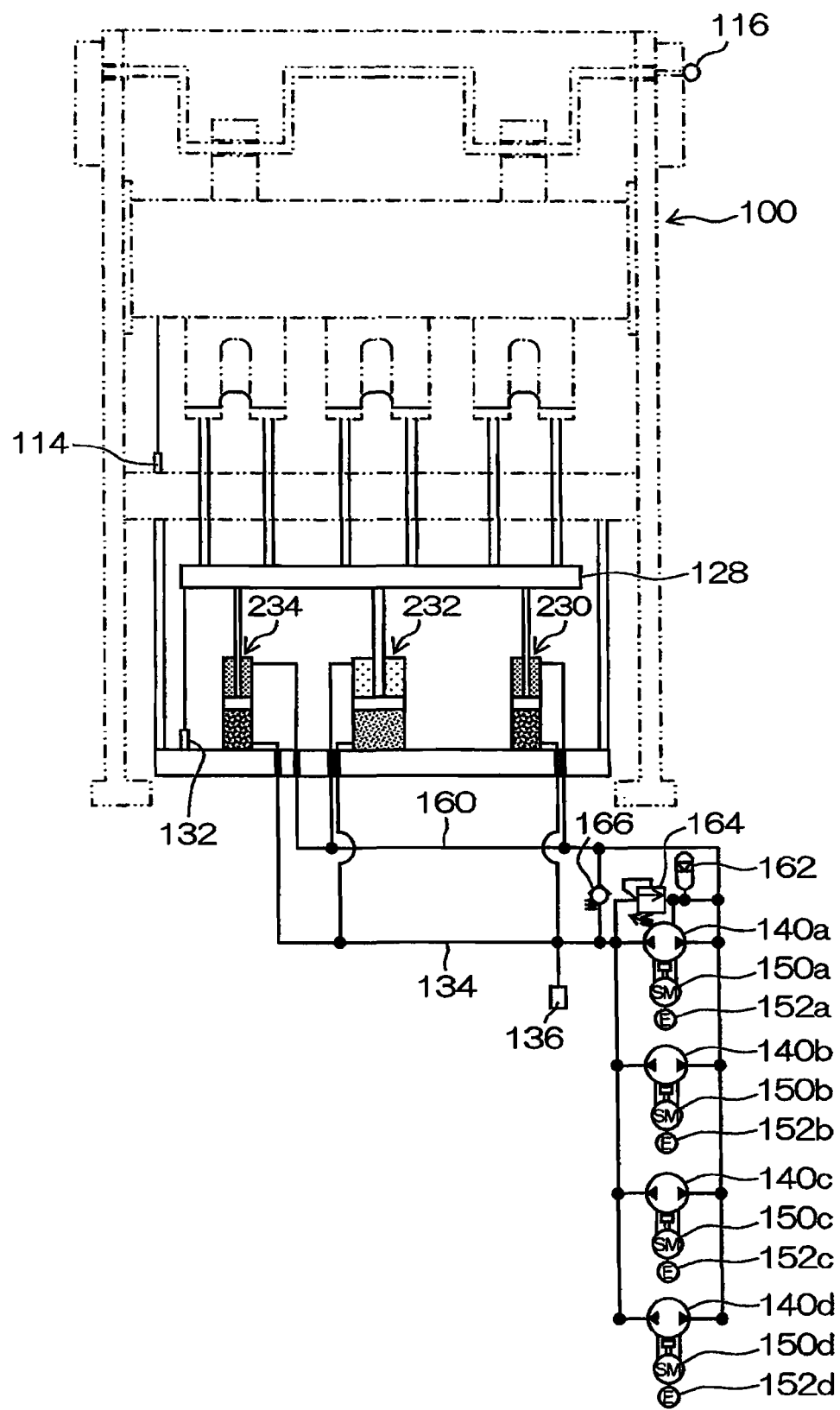
FIG. 10 is a configuration diagram that illustrates a fifth embodiment of the die cushion apparatus of a press machine according to the present invention.

FIG. 10 is a configuration diagram that illustrates the fifth embodiment of a die cushion apparatus of a press machine according to the present invention. The parts common with parts of the die cushion apparatus of the fourth embodiment as illustrated in FIG. 9 are assigned the same reference numerals and detailed explanations thereof are omitted.

In comparison to the die cushion apparatus of a press machine according to the fourth embodiment as illustrated in FIG. 9, the die cushion apparatus according to the fifth embodiment illustrated in FIG. 10 is different in the respect that a plurality of sets (four sets in this example) of oil hydraulic pump/motors 140a to 140d, electric motors 150a to 150d, and motor angular velocity detectors 152a to 152d are provided.

One of the discharge openings of each of the oil hydraulic pump/motors 140a to 140d is commonly connected to the piping 134 that connects to the respective lower chambers 230b, 232b, and 234b of the oil hydraulic cylinders 230, 232, and 234. The other discharge opening (accumulator 164 side) of each of the oil hydraulic pump/motors 140a to 140d is commonly connected to the piping 160 that connects to the respective upper chambers 230a, 232a, and 234a of the oil hydraulic cylinders 230, 232, and 234.

The reason for providing a plurality of sets of oil hydraulic pump/motors 140a to 140d and electric motors 150a to 150d in this manner is that there is a limit to the displacement volume of pressure oil of oil hydraulic pump/motors or the output torque of electric motors that are commercially available.

Control Apparatus (Fourth Embodiment)

Figure 11:
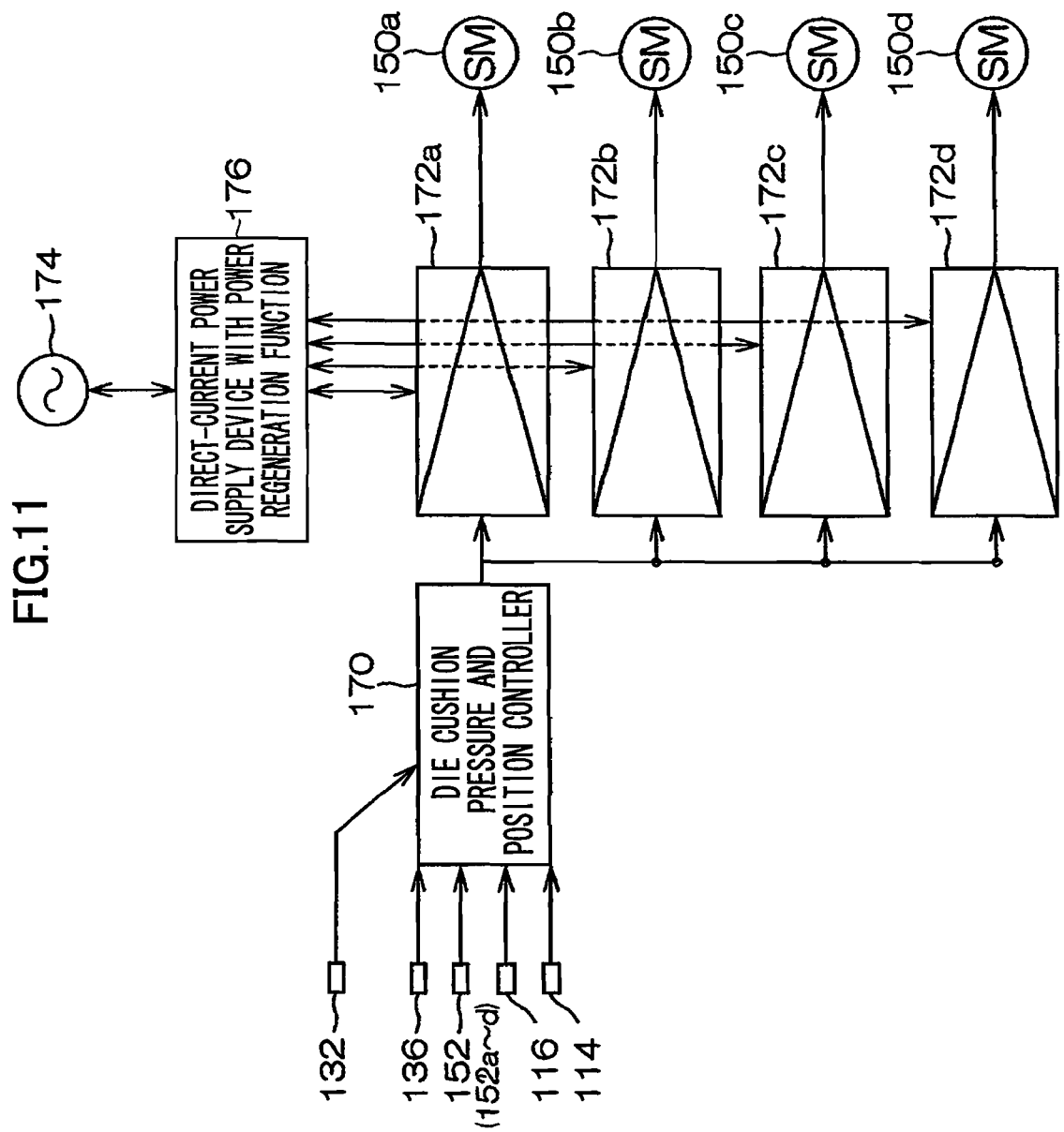
FIG. 11 is a view that illustrates a fourth embodiment of a control apparatus in a die cushion apparatus of a press machine according to the present invention.

FIG. 11 is a view that illustrates a fourth embodiment of a control apparatus for the die cushion apparatus of a press machine according to the present invention, and shows a control apparatus that can be applied to the die cushion apparatus according to the fifth embodiment as shown in FIG. 10. The parts common with parts of the control apparatus according to the first embodiment as illustrated in FIG. 2 are assigned the same reference numerals and detailed explanations thereof are omitted.

In comparison to the control apparatus according to the first embodiment as illustrated in FIG. 2, the control apparatus according to the fourth embodiment illustrated in FIG. 11 is different in the respect that amplifier and PWM controllers 172a to 172d are provided for each of the electric motors 150a to 150d.

The die cushion pressure and position controller 170 conducts die cushion pressure control by outputting a torque command value that is calculated using a die cushion pressure command value, a pressure detection signal, and a motor angular velocity signal (press velocity signal) to the electric motors 150a to 150d through the amplifier and PWM controllers 172a to 172d.

In this connection, although the oil hydraulic pump/motors 140a to 140d that are respectively driven by the electric motors 150a to 150d basically generate the same torque, in order to ensure dynamic stability when performing die cushion pressure control and positional control, the die cushion pressure and position controller 170 receives respective angular velocity detection signals that are input from the motor angular velocity detectors 152a to 152 of the electric motors 150a to 150d.

Control Apparatus (Fifth Embodiment)

Figure 12:
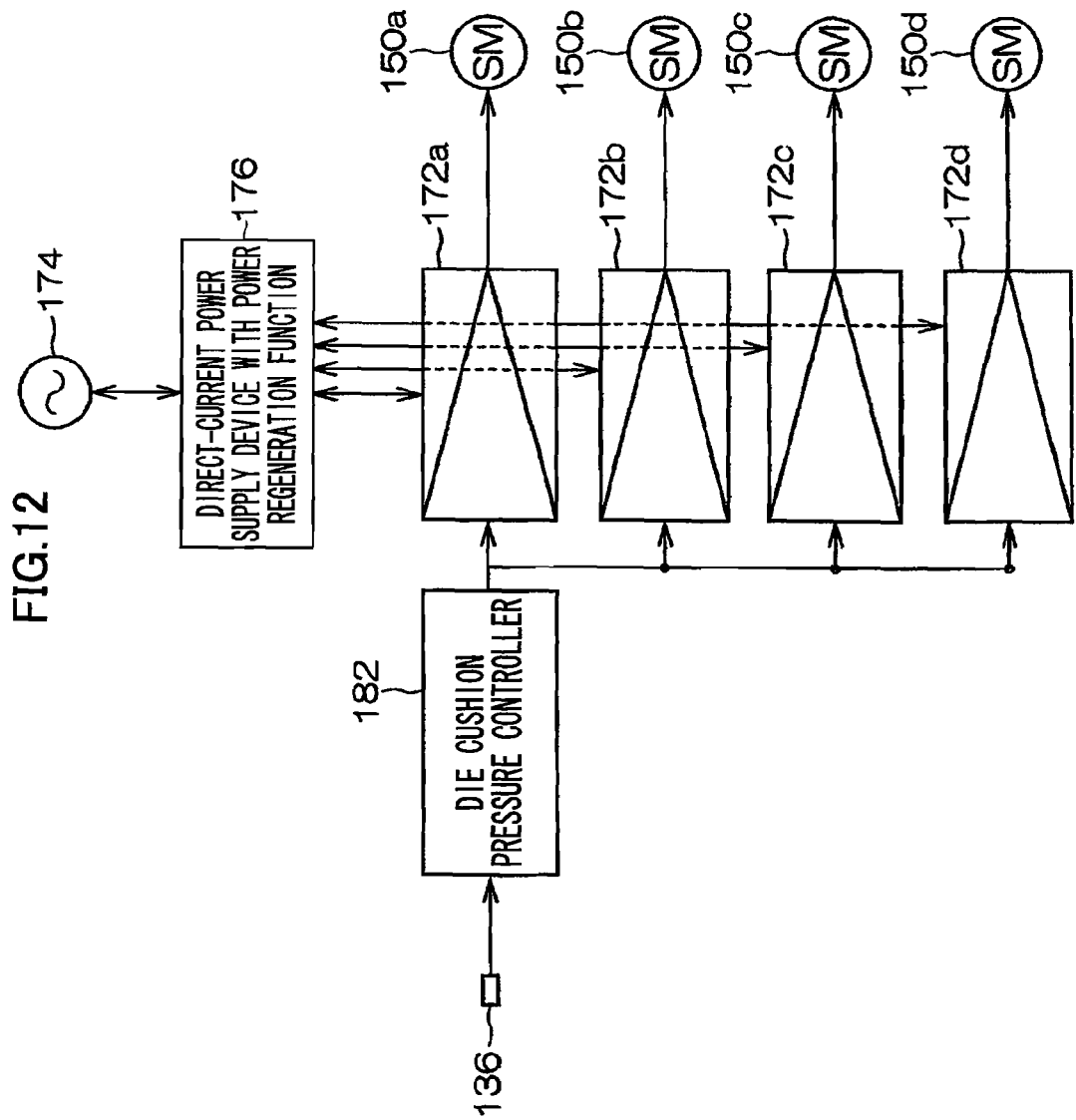
FIG. 12 is a view that illustrates a fifth embodiment of a control apparatus in a die cushion apparatus of a press machine according to the present invention.

FIG. 12 is a view that illustrates a fifth embodiment of a control apparatus for the die cushion apparatus of a press machine according to the present invention, and shows a control apparatus that can be applied to the die cushion apparatus according to the fifth embodiment as shown in FIG. 10. The parts common with parts of the control apparatus according to the third embodiment as illustrated in FIG. 6 are assigned the same reference numerals and detailed explanations thereof are omitted.

In comparison to the control apparatus according to the third embodiment as illustrated in FIG. 6, the control apparatus according to the fourth embodiment illustrated in FIG. 12 is different in the respect that amplifier and PWM controllers 172a to 172d are provided for each of the electric motors 150a to 150d.

Configuration of Die Cushion Apparatus (Sixth Embodiment)

Figure 13:
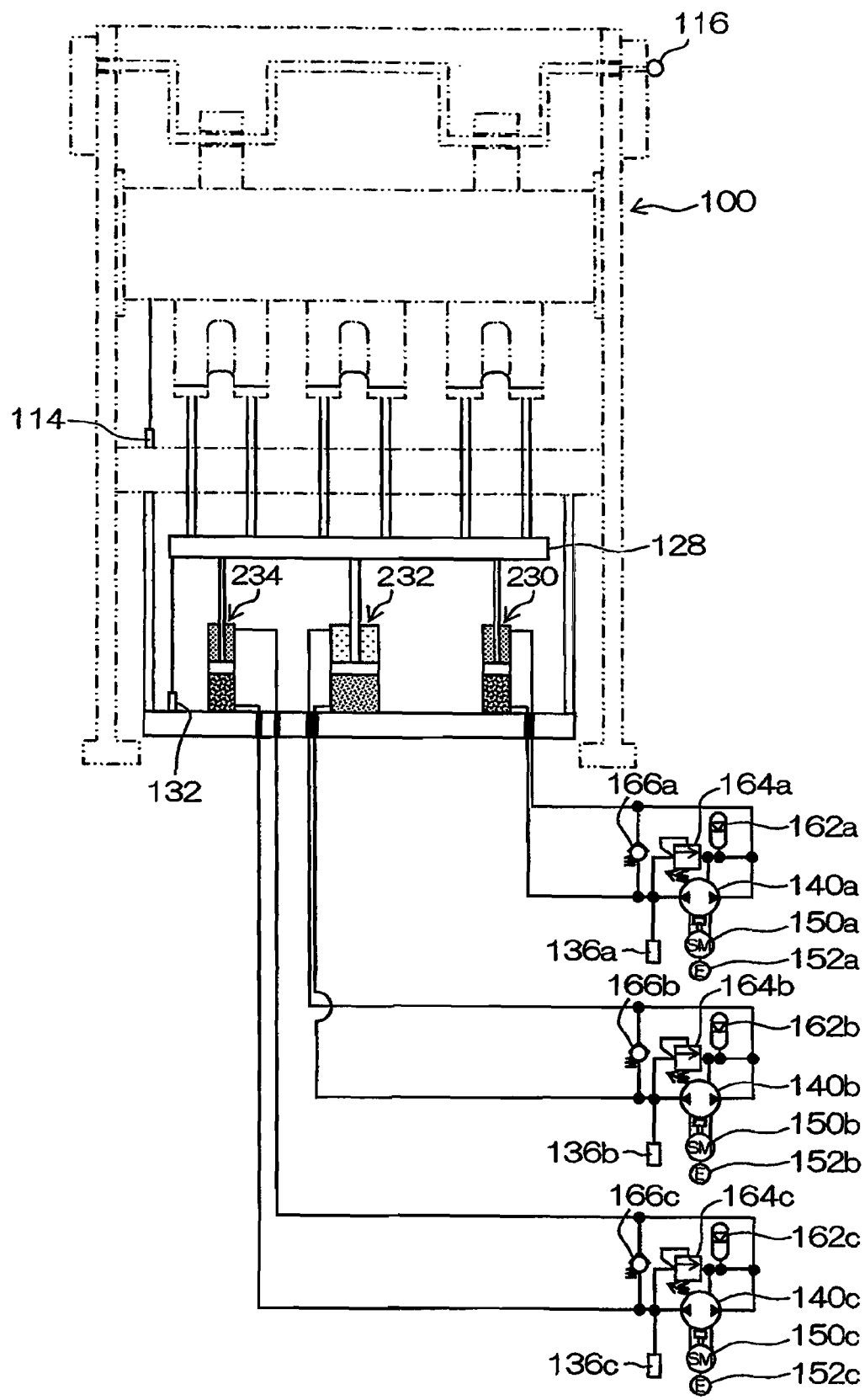
FIG. 13 is a configuration diagram that illustrates a sixth embodiment of the die cushion apparatus of a press machine according to the present invention.

FIG. 13 is a configuration diagram that illustrates the sixth embodiment of the die cushion apparatus of a press machine according to the present invention. The parts common with parts of the die cushion apparatus of the fifth embodiment as illustrated in FIG. 10 are assigned the same reference numerals and detailed explanations thereof are omitted.

In comparison to the die cushion apparatus of a press machine of the fifth embodiment as illustrated in FIG. 10, the die cushion apparatus of the sixth embodiment illustrated in FIG. 13 is different in the respect that hydraulic circuits (hydraulic circuits including oil hydraulic pump/motors 140a to 140c, accumulators 162a to 162c, relief valves 164a to 164c, and check valves 166a to 166c) are independently provided for each of the oil hydraulic cylinders 230, 232, and 234.

Accordingly, the pressures of the lower chambers 230b, 232b, and 234b of the oil hydraulic cylinders 230, 232, and 234 are individually detected by pressure detectors 136a, 136b, and 136c.

In the case of the die cushion apparatus according to this configuration, each oil hydraulic cylinder 230, 232, and 234 can be individually controlled and, as a result, even when an eccentric load is applied to the cushion pad 128, a die cushion pressure can be produced in accordance with the eccentric load.

Control Apparatus (Sixth Embodiment)

Figure 14:
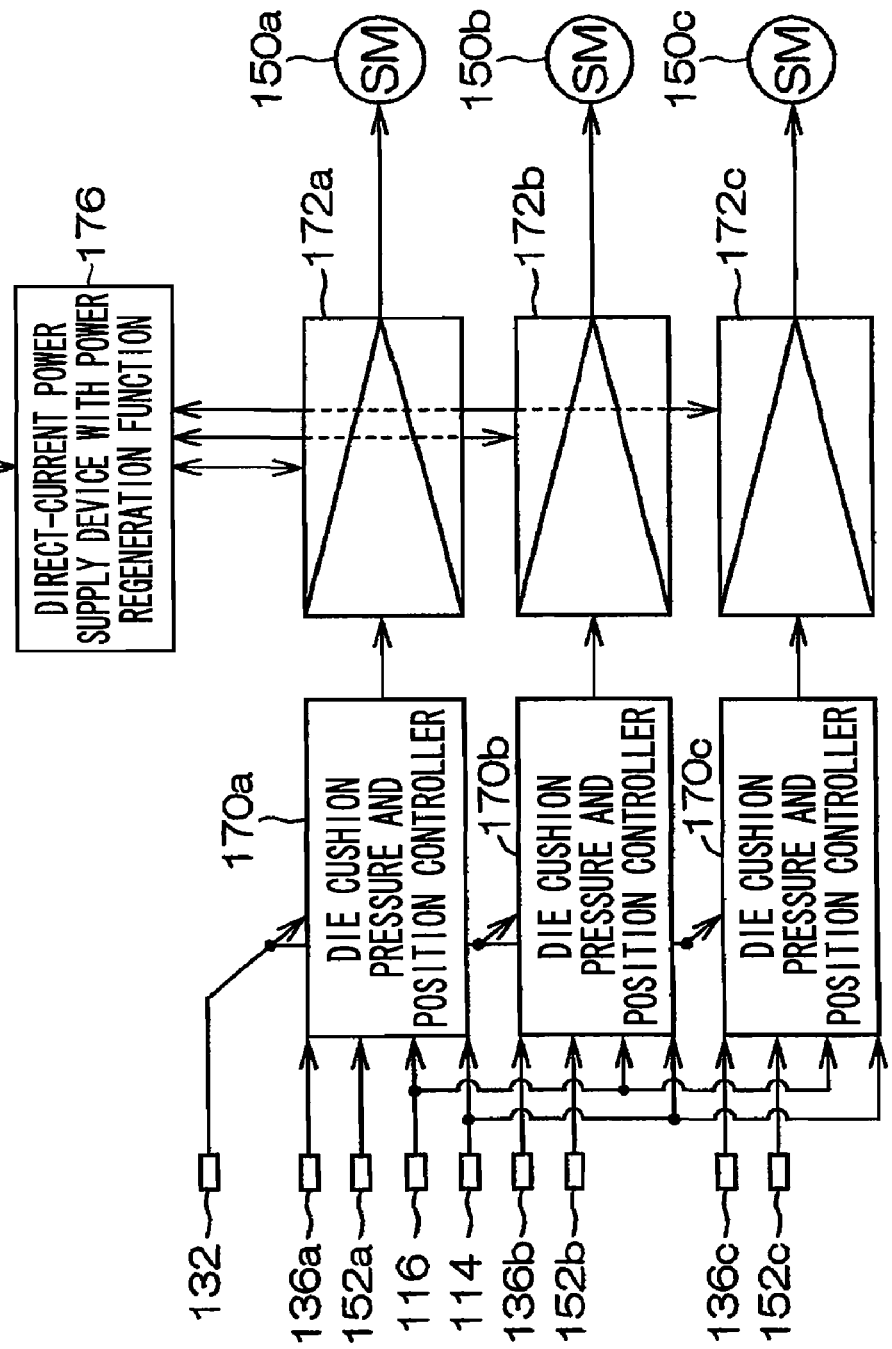
FIG. 14 is a view that illustrates a sixth embodiment of a control apparatus in a die cushion apparatus of a press machine according to the present invention.

FIG. 14 is a view that illustrates a sixth embodiment of a control apparatus for a die cushion apparatus of a press machine according to the present invention, and shows a control apparatus that can be applied to the die cushion apparatus of the sixth embodiment as shown in FIG. 13. The parts common with parts of the control apparatus according to the first embodiment as illustrated in FIG. 2 are assigned the same reference numerals and detailed explanations thereof are omitted.

In comparison to the control apparatus according to the first embodiment as illustrated in FIG. 2, the control apparatus according to the sixth embodiment illustrated in FIG. 14 is different in the respect that die cushion pressure and position controllers 170a to 170c and amplifier and PWM controllers 172a to 172c are provided for each of the electric motors 150a to 150c.

Each of the die cushion pressure and position controllers 170a to 170c receives respective pressure detection signals that are respectively input from the pressure detectors 136a to 136c and also receives respective angular velocity signals that are respectively input from the motor angular velocity detectors 152a to 152c. Each of the die cushion pressure and position controllers 170a to 170c also receives the same crank angular velocity signal, slide position detection signal, and die cushion position detection signal from the crank angular velocity detector 116, the slide position detector 114, and the die cushion position detector 132, respectively.

Each of the die cushion pressure and position controllers 170a to 170c calculates respective torque command values based on the above described input signals, and perform die cushion pressure control by outputting these torque command values to the electric motors 150a to 150c through the amplifier and PWM controllers 172a to 172c.

Control Apparatus (Seventh Embodiment)

Figure 15:
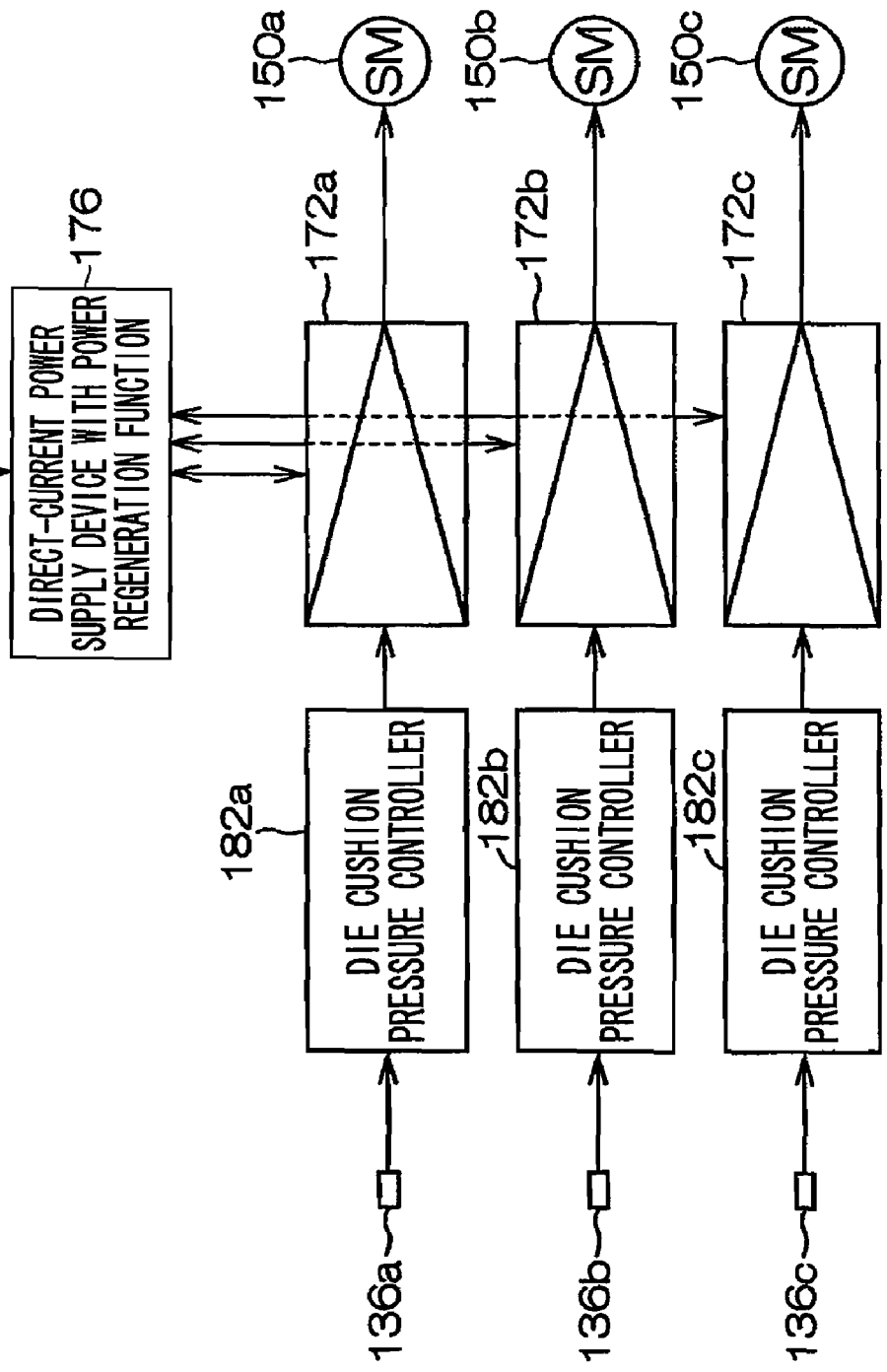
FIG. 15 is a view that illustrates a seventh embodiment of a control apparatus in a die cushion apparatus of a press machine according to the present invention.

FIG. 15 is a view that illustrates a seventh embodiment of a control apparatus for a die cushion apparatus of a press machine according to the present invention, and shows a control apparatus that can be applied to the die cushion apparatus of the sixth embodiment as shown in FIG. 13. The parts common with parts of the control apparatus according to the third embodiment as illustrated in FIG. 6 are assigned the same reference numerals and detailed explanations thereof are omitted.

In comparison to the control apparatus according to the third embodiment as illustrated in FIG. 6, the control apparatus according to the seventh embodiment illustrated in FIG. 15 is different in the respect that die cushion pressure controllers 182a to 182c and amplifier and PWM controllers 172a to 172c are provided for each of the electric motors 150a to 150c.

Each of the die cushion pressure controllers 182a to 182c receives respective pressure detection signals that are respectively input from the pressure detectors 136a to 136c, and performs die cushion pressure control by outputting torque command values that are respectively calculated using a predetermined die cushion pressure command value and pressure detection signals that are input from the pressure detectors 136a to 136c to the electric motors 150a to 150c through the amplifier and PWM controllers 172a to 172c.

Configuration of Die Cushion Apparatus (Seventh Embodiment)

Figure 16:
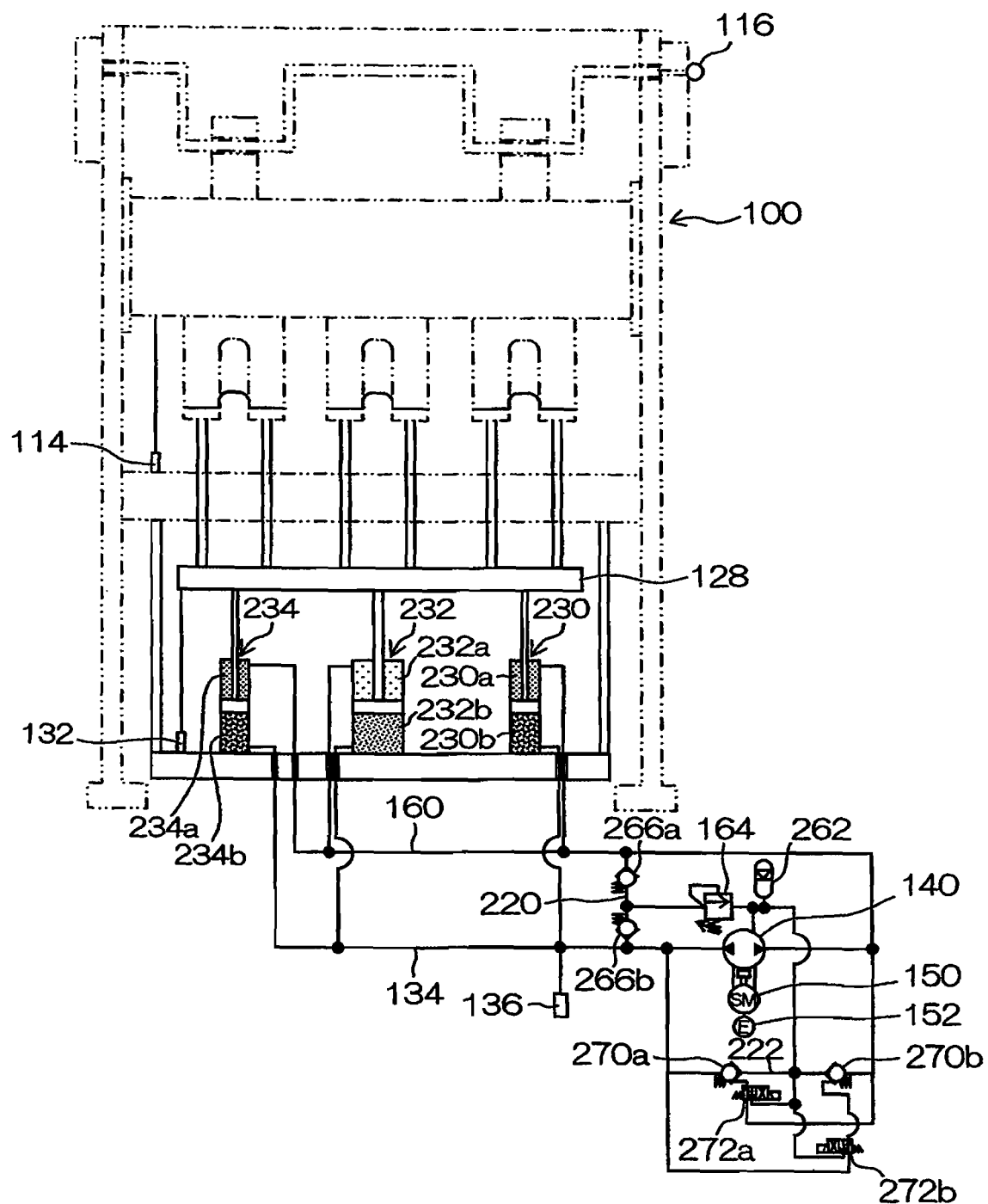
FIG. 16 is a configuration diagram that illustrates a seventh embodiment of the die cushion apparatus of a press machine according to the present invention.

FIG. 16 is a configuration diagram that illustrates the seventh embodiment of the die cushion apparatus of a press machine according to the present invention. The parts common with parts of the die cushion apparatus of the fourth embodiment as illustrated in FIG. 9 are assigned the same reference numerals and detailed explanations thereof are omitted.

In comparison to the die cushion apparatus of a press machine according to the fourth embodiment as illustrated in FIG. 9, the die cushion apparatus according to the seventh embodiment illustrated in FIG. 16 differs mainly in the respect that the other discharge opening of the oil hydraulic pump/motor 140 connects to the upper chambers 230a, 232a, and 234a of the oil hydraulic cylinders 230, 232, and 234 through the common piping 160 without directly communicating with an accumulator (or tank).

It is thereby possible to control a downward movement of the oil hydraulic cylinders 230, 232, and 234 (cushion pad 128) and also to stabilize a raising operation and a knockout operation.

Further, two check valves 266a and 266b in mutually opposing directions are disposed in a piping 220 that connects the piping 134 and the piping 160, and a relief valve 164 is connected to the piping 220 between these check valves 266a and 266b. The inflow and outflow of pressure oil between the piping 134 and the piping 160 is prevented by the two check valves 266a and 266b, and when an abnormal pressure occurs in either the piping 134 or piping 160, the pressure can be released through the single relief valve 164.

Two pilot-opening type check valves 270a and 270b are disposed in mutually opposing directions in another piping 222 that connects the piping 134 and the piping 160, and an accumulator 262 is connected to the piping 222 between these pilot-opening type check valves 270a and 270b.

Electromagnetic direction switching valves 272a and 272b are provided for performing open and close operations of the pilot-opening type check valves 270a and 270b, respectively, and are configured so that pilot pressures from the accumulator 262 are applied thereto.

In the present example, when executing a die cushion function or an independent raising operation, the pilot-opening type check valve 270a is closed (allowing a low pressure from the accumulator 262 to act) by exciting (turning on) the electromagnetic direction switching valve 272a and the pilot-opening type check valve 270b is opened (causing a die cushion pressure or a drive pressure to effect a pilot action) by non-excitation of (turning off) the electromagnetic direction switching valve 272b. In contrast, when performing an independent descent operation, the pilot-opening type check valve 270b is closed by turning on the electromagnetic direction switching valve 272b and the pilot-opening type check valve 270a is opened by turning off the electromagnetic direction switching valve 272a.

The reason for opening and closing the pilot-opening type check valves 270a and 270b in this manner is that since the oil amounts flowing into and out of the upper chambers 230a, 232a, and 234a and the oil amounts flowing into and out of the lower chambers 230b, 232b, and 234b of the oil hydraulic cylinders 230, 232, and 234 are different, an excess or deficient amount is allowed to flow into or out from the accumulator 262 to balance the different oil amounts. In this connection, it is possible to supply the substantially constant low pressure oil that is filled in the accumulator 162 to the upper chambers 230a, 232a, and 234a and the lower chambers 230b, 232b, and 234b of the oil hydraulic cylinders 230, 232, and 234 through the pilot-opening type check valves 270a and 270b, to perform pre-pressurization to facilitate pressurization when performing die cushion pressure control.

Configuration of Die Cushion Apparatus (Eighth Embodiment)

Figure 17:
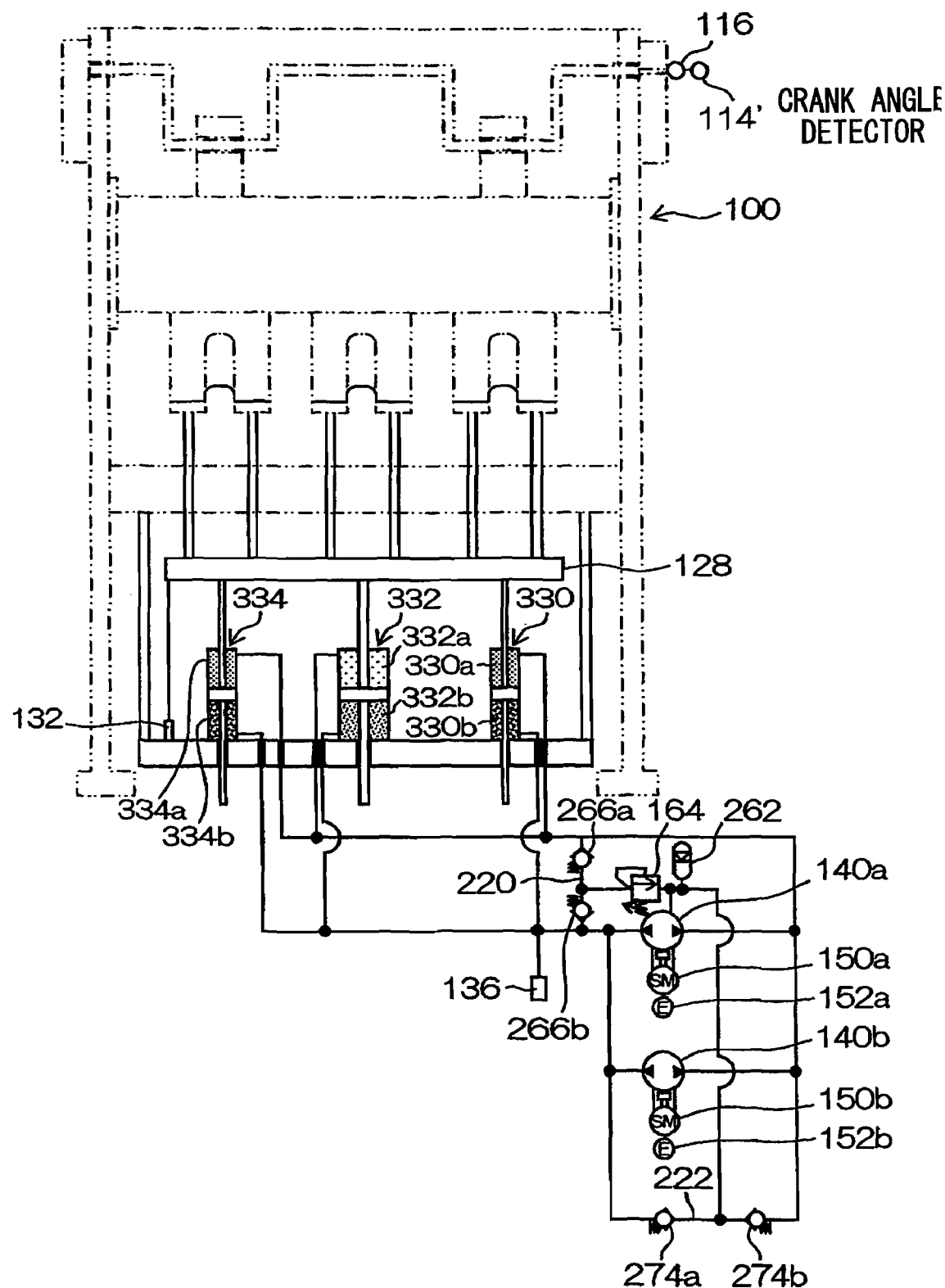
FIG. 17 is a configuration diagram that illustrates an eighth embodiment of the die cushion apparatus of a press machine according to the present invention.

FIG. 17 is a configuration diagram that illustrates the eighth embodiment of the die cushion apparatus of a press machine according to the present invention. The parts common with parts of the die cushion apparatus of the seventh embodiment as illustrated in FIG. 16 are assigned the same reference numerals and detailed explanations thereof are omitted.

In comparison to the die cushion apparatus of a press machine according to the seventh embodiment as illustrated in FIG. 16, the die cushion apparatus according to the eighth embodiment illustrated in FIG. 17 differs mainly in the respect that double-rod type oil hydraulic cylinders 330, 332, and 334 are employed in place of the single-rod type oil hydraulic cylinders 230, 232, and 234, and that check valves 274a and 274b are provided in place of the pilot-opening type check valves 270a and 270b. Further, a crank angle detector 114' is provided in place of the slide position detector 114.

The check valves 274a and 274b supply a substantially constant low pressure oil to upper chambers 330a, 332a, and 334a and lower chambers 330b, 332b, and 334b of the oil hydraulic cylinders 330, 332, and 334 from the accumulator 162 to fulfill a role of performing pre-pressurizing to facilitate pressurization when performing die cushion pressure control.

Further, in the oil hydraulic cylinders 330, 332, and 334, since oil amounts that flow into and out from the upper chambers 330a, 332a, and 334a correspond with oil amounts that flow into and out from the lower chambers 330b, 332b, and 334b, because the oil hydraulic cylinders 330, 332, and 334 are double-rod cylinders, it is not necessary to regulate the oil amounts as described above using the pilot-opening type check valves 270a and 270b.

Configuration of Die Cushion Apparatus (Ninth Embodiment)

Figure 18:
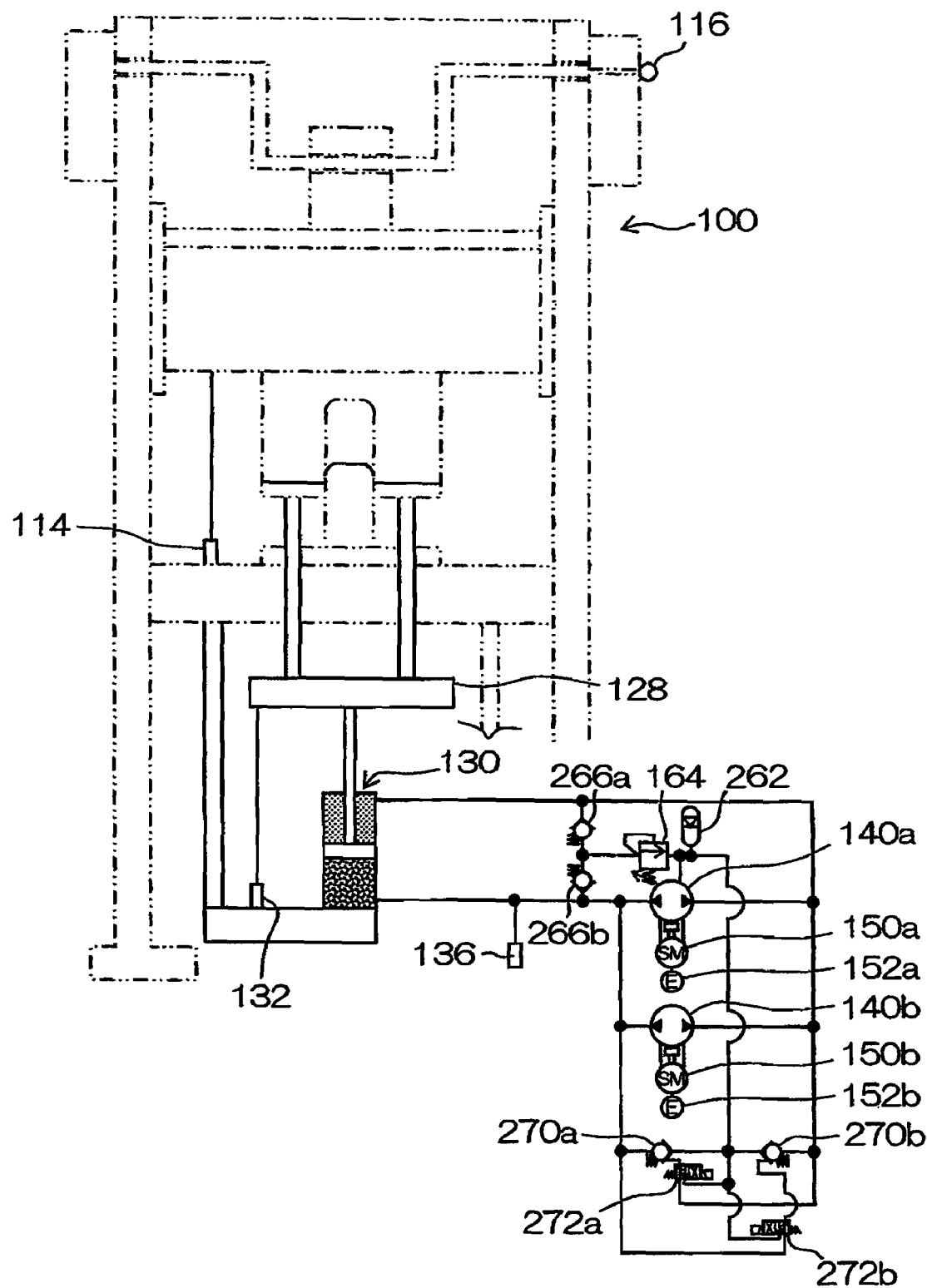
FIG. 18 is a configuration diagram that illustrates a ninth embodiment of the die cushion apparatus of a press machine according to the present invention.

FIG. 18 is a configuration diagram that illustrates the ninth embodiment of the die cushion apparatus of a press machine according to the present invention. The parts common with parts of the die cushion apparatus of the seventh embodiment as illustrated in FIG. 16 are assigned the same reference numerals and detailed explanations thereof are omitted.

In comparison to the die cushion apparatus of a press machine according to the seventh embodiment as illustrated in FIG. 16, the die cushion apparatus according to the ninth embodiment illustrated in FIG. 18 differs in the respect that while the die cushion apparatus according to the seventh embodiment has a plurality of oil hydraulic cylinders 230 to 234 and one set of an oil hydraulic pump/motor 140 and an electric motor 150, the die cushion apparatus according to the ninth embodiment comprises a single oil hydraulic cylinder 130 and a plurality of sets (two sets) of oil hydraulic pump/motors 140a and 140b and electric motors 150a and 150b for driving the single oil hydraulic cylinder 130.

Configuration of Die Cushion Apparatus (Tenth Embodiment)

Figure 19:
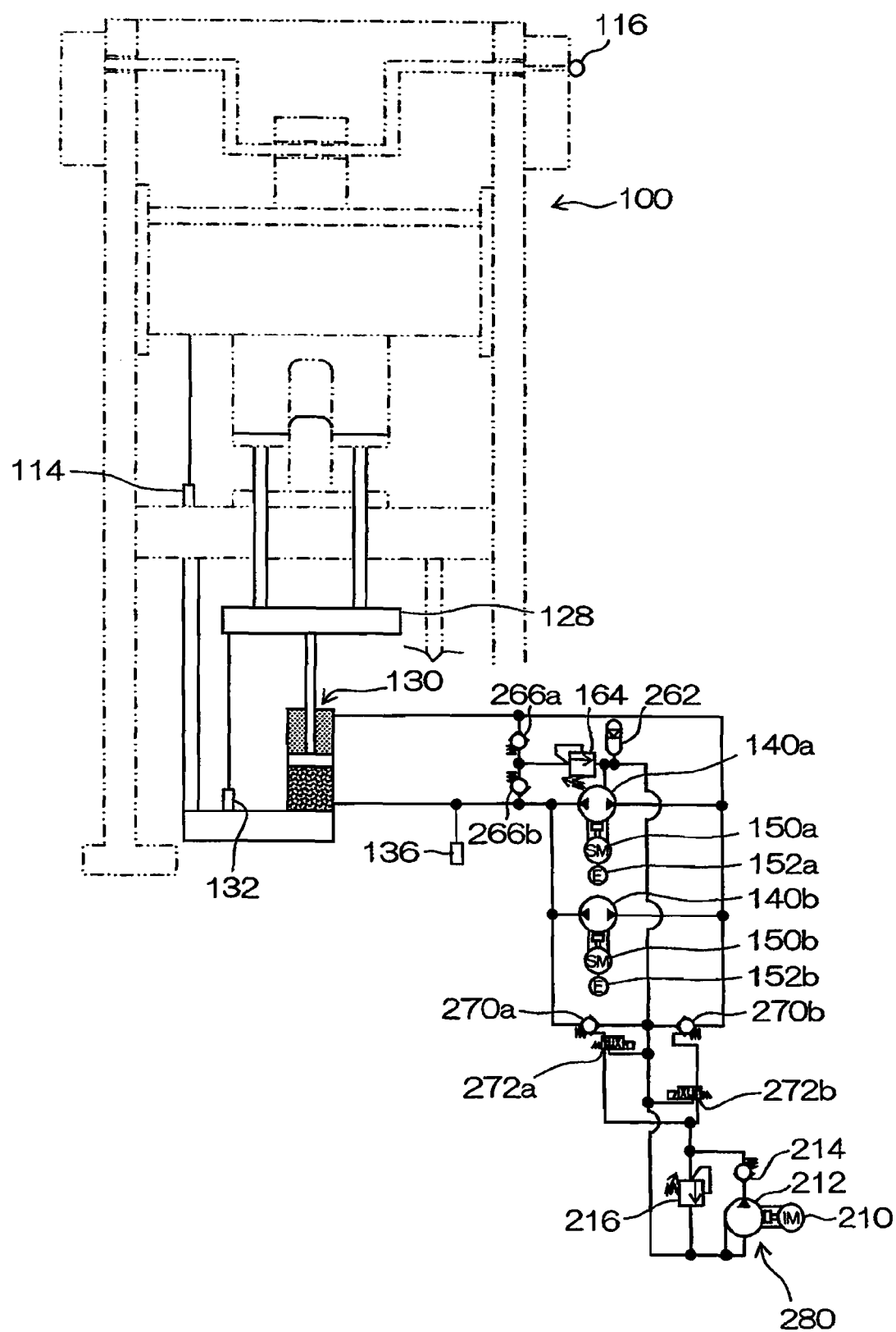
FIG. 19 is a configuration diagram that illustrates a tenth embodiment of the die cushion apparatus of a press machine according to the present invention.

FIG. 19 is a configuration diagram that illustrates the tenth embodiment of the die cushion apparatus of a press machine according to the present invention. The parts common with parts of the die cushion apparatus of the ninth embodiment as illustrated in FIG. 18 are assigned the same reference numerals and detailed explanations thereof are omitted.

In comparison to the die cushion apparatus of a press machine according to the ninth embodiment as illustrated in FIG. 18, the die cushion apparatus according to the tenth embodiment illustrated in FIG. 19 differs in the respect that it comprises a separate pressure source 280 that produces a pilot pressure.

The pressure source 280 comprises an electric (induction) motor 210, an oil hydraulic pump 212, a check valve 214, and a relief valve 216. The check valve 214 is provided to stabilize the discharge of the oil hydraulic pump 212 that is driven with the electric motor 210, and the relief valve 216 is used for regulating the pilot pressure.

By enabling a pilot pressure to be supplied from the pressure source 280 of the above described configuration to the pilot-opening type check valves 272a and 272b, the pilot-opening type check valves 272a and 272b can be opened and closed with greater accuracy and higher speed than in a case of supplying a pilot pressure from the accumulator 262. In the case of the present example, by turning off the electromagnetic direction switching valves 272a and 272b, a pilot pressure from the pressure source 280 can be applied to the pilot-opening type check valves 272a and 272b, respectively.

Configuration of Die Cushion Apparatus (Eleventh Embodiment)

Figure 20:
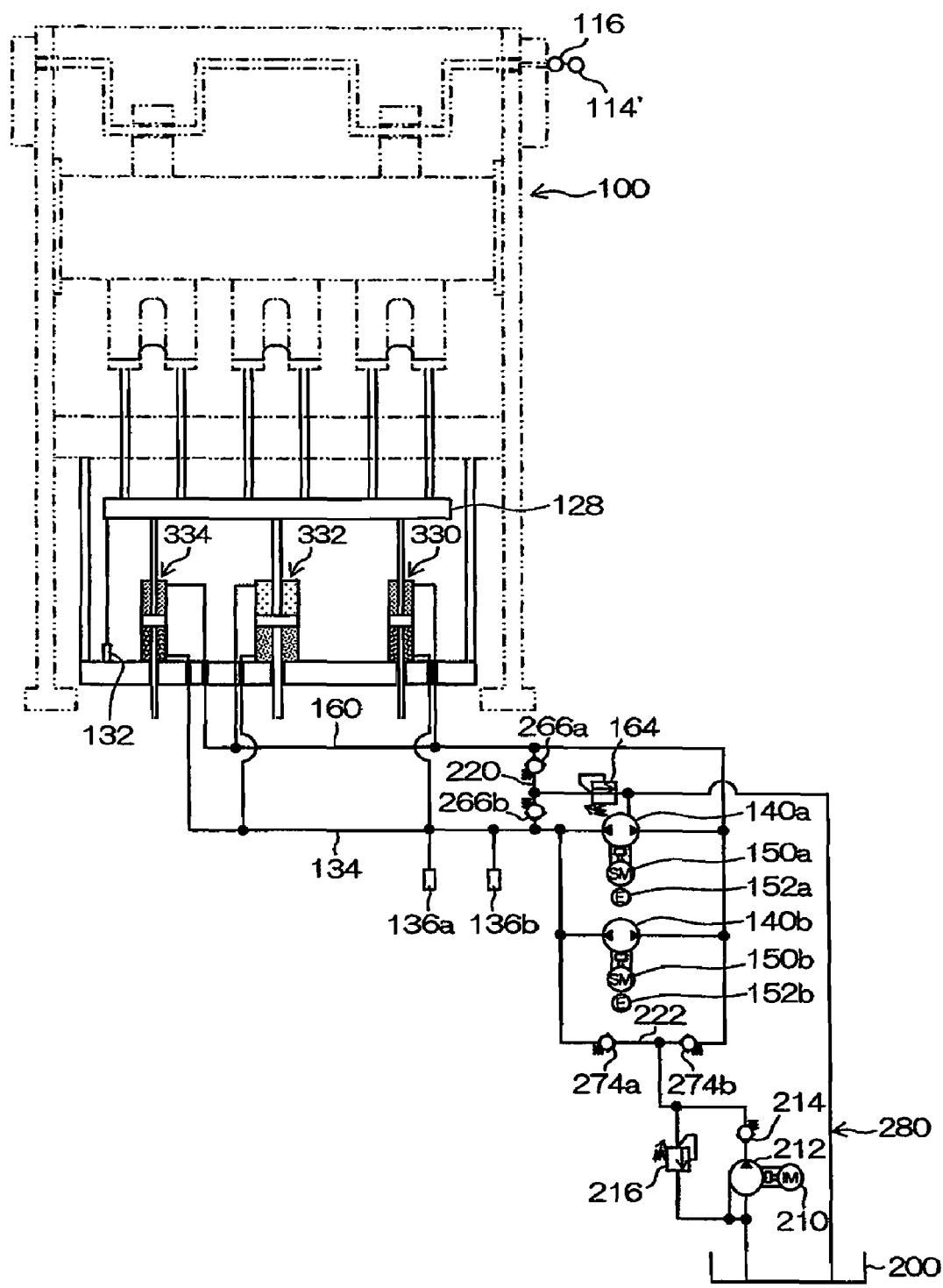
FIG. 20 is a configuration diagram that illustrates an eleventh embodiment of the die cushion apparatus of a press machine according to the present invention.

FIG. 20 is a configuration diagram that illustrates the eleventh embodiment of the die cushion apparatus of a press machine according to the present invention. The parts common with parts of the die cushion apparatus of the eighth embodiment as illustrated in FIG. 17 are assigned the same reference numerals and detailed explanations thereof are omitted.

In comparison to the die cushion apparatus of a press machine according to the eighth embodiment as illustrated in FIG. 17, the die cushion apparatus according to the eleventh embodiment illustrated in FIG. 20 differs in the respect that while the die cushion apparatus according to the eighth embodiment employs the accumulator 262 as a pressure source that pre-pressurizes the upper chambers 330a, 332a, and 334a and the lower chambers 330b, 332b, and 334b of the oil hydraulic cylinders 330, 332, and 334, the die cushion apparatus according to the eleventh embodiment comprises a separate pressure source 280 that pre-pressurizes the upper chambers 330a, 332a, and 334a and the lower chambers 330b, 332b, and 334b of the oil hydraulic cylinders 330, 332, and 334. Further, according to the eleventh embodiment the tank 200 is provided in place of the accumulator 262.

The pressure source 280 comprises the electric (induction) motor 210, the oil hydraulic pump 212, the check valve 214, and the relief valve 216, and supplies pressure oil for pre-pressurization to the piping 222 between the two check valves 274a and 274b.

Further, two pressure detectors 136a and 136b are provided in the piping 134 that is commonly connected to the lower chambers 330b, 332b and 334b of the oil hydraulic cylinders 330, 332 and 334. Thereby, a die cushion function can be normally obtained even when one of the pressure detectors 136a and 136b fails, thus enhancing safety.

Configuration of Die Cushion Apparatus (Twelfth Embodiment)

Figure 21:
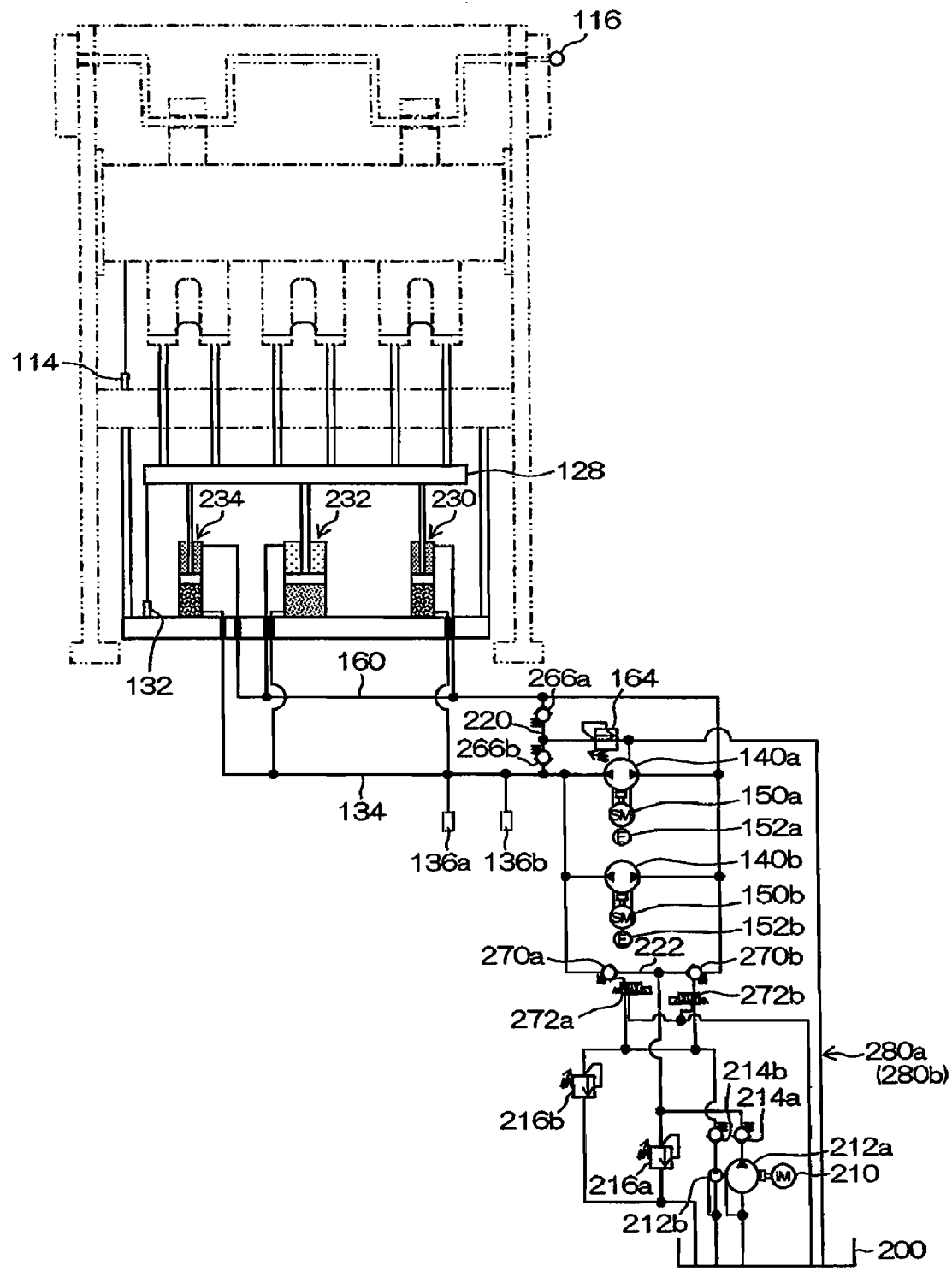
FIG. 21 is a configuration diagram that illustrates a twelfth embodiment of the die cushion apparatus of a press machine according to the present invention.

FIG. 21 is a configuration diagram that illustrates the twelfth embodiment of the die cushion apparatus of a press machine according to the present invention. The parts common with parts of the die cushion apparatus of the seventh embodiment as illustrated in FIG. 16 are assigned the same reference numerals and detailed explanations thereof are omitted.

In comparison to the die cushion apparatus of a press machine according to the seventh embodiment as illustrated in FIG. 16, the die cushion apparatus according to the twelfth embodiment illustrated in FIG. 21 differs in the respect that while the die cushion apparatus according to the seventh embodiment employs the accumulator 262 as a pressure source that pre-pressurizes the upper chambers 330a, 332a, and 334a and the lower chambers 330b, 332b, and 334b of the oil hydraulic cylinders 330, 332, and 334, the die cushion apparatus according to the twelfth embodiment comprises a separate pressure source 280a that pre-pressurizes the upper chambers 330a, 332a, and 334a and the lower chambers 330b, 332b, and 334b of the oil hydraulic cylinders 330, 332, and 334, and a separate pressure source 280b that produces a pilot pressure that is applied to the pilot-opening type check valves 270a and 270b.

According to the twelfth embodiment the tank 200 is provided in place of the accumulator 262, and two pressure detectors 136a and 136b are also provided in the piping 134 that is commonly connected to the lower chambers 330b, 332b, and 334b of the oil hydraulic cylinders 330, 332, and 334.

The pressure source 280a comprises the electric (induction) motor 210, an oil hydraulic pump 212a, a check valve 214a, and a relief valve 216a, and supplies pressure oil for pre-pressurization to the piping 222 between the two check valves 274a and 274b.

Further, the pressure source 280b comprises the electric motor 210, an oil hydraulic pump 212b, a check valve 214b, and a relief valve 216b, and supplies a required pilot pressure to the pilot-opening type check valves 272a and 272b, respectively.

In the case of the present example, by turning off the electromagnetic direction switching valves 272a and 272b, a pilot pressure from the pressure source 280b can be applied to the pilot-opening type check valves 272a and 272b, respectively to open the pilot-opening type check valves 272a and 272b.

It is to be understood that although the die cushion apparatuses according to the first to twelfth embodiments were described using oil as a hydraulic fluid, the present invention is not limited thereto, and water or another fluid may also be used. Further, the die cushion apparatus according to the present invention is not limited to a clamp press, and can also be applied to a press machine such as another mechanical press, an electric (servo) press, and a hydraulic press.

The invention claimed is:

1. A die cushion apparatus of a press machine, comprising:
   at least one fluid hydraulic cylinder that supports a cushion pad;
   a pressure detector that detects a pressure of a pressure chamber on a cushion pressure production side of the fluid hydraulic cylinder;
   at least one fluid hydraulic pump/motor having a discharge opening that is connected through a first pipe to the pressure chamber on a cushion pressure production side of the fluid hydraulic cylinder;
   at least one electric motor that is connected to a rotating shaft of the fluid hydraulic pump/motor;
   a die cushion pressure command device that outputs a die cushion pressure command that is previously set;
   a control device that controls a torque of the electric motor so that a die cushion pressure is a pressure that corresponds to the die cushion pressure command based on the die cushion pressure command and a pressure that is detected by the pressure detector; and
   a regeneration device that regenerates energy required for a die cushioning action that the cushion pad receives when die cushioning of the press machine is effected as electrical energy through the fluid hydraulic cylinder, the fluid hydraulic pump/motor, and the electric motor.

2. The die cushion apparatus of a press machine according to claim 1, wherein the at least one fluid hydraulic cylinder is a plurality of the fluid hydraulic cylinders that support the cushion pad, and respective pressure chambers on a cushion pressure production side of each fluid hydraulic cylinder are commonly connected to the first pipe.

3. The die cushion apparatus of a press machine according to claim 1, wherein
   the at least one fluid hydraulic pump/motor and the at least one electric motor are a plurality of sets of a fluid hydraulic pump/motor and an electric motor, and respective discharge openings of the plurality of fluid hydraulic pump/motors are commonly connected to the first pipe.

4. The die cushion apparatus of a press machine according to claim 1, wherein
   an other discharge opening of the fluid hydraulic pump/motor is connected to a pressure chamber on a descent side of the fluid hydraulic cylinder through a second pipe, and the second pipe is connected with an accumulator that is filled with a liquid of a substantially constant low pressure.

5. The die cushion apparatus of a press machine according to claim 1, wherein
   an other discharge opening of the fluid hydraulic pump/motor is connected to a tank through a second pipe.

6. The die cushion apparatus of a press machine according to claim 1, wherein
   an other discharge opening of the fluid hydraulic pump/motor is connected to a pressure chamber on a descent side of the fluid hydraulic cylinder through a second pipe without directly communicating with a substantially constant low pressure source comprising one of a tank and an accumulator.

7. The die cushion apparatus of a press machine according to claim 6, further comprising two check valves provided in mutually opposite directions in a third pipe that connects a first pipe that is connected to a pressure chamber on the cushion pressure production side of the fluid hydraulic cylinder and a second pipe that is connected to a pressure chamber on a descent side of the fluid hydraulic cylinder, and
   a relief valve connected to the third pipe between the two check valves such that an abnormal pressure that is produced in a pressure chamber on the cushion pressure production side or a pressure chamber on a descent side of the fluid hydraulic cylinder is released through the relief valve.

8. The die cushion apparatus of a press machine according to claim 1, further comprising a relief valve connected to the first pipe such that an abnormal pressure that is produced in a pressure chamber on the cushion pressure production side of the fluid hydraulic cylinder is released through the relief valve.

9. The die cushion apparatus of a press machine according to claim 8, further comprising an accumulator that is filled with a liquid of a substantially constant low pressure, wherein
   the accumulator is connected to a low pressure line of the relief valve and also connected to two pressure chambers or a pressure chamber on the cushion pressure production side of the fluid hydraulic cylinder through one of a check valve and a pilot-opening type check valve.

10. The die cushion apparatus of a press machine according to claim 8, further comprising a tank that is connected to a low pressure line of the relief valve, wherein
   a low pressure liquid is discharged with a liquid pressure pump from the tank through one of a check valve and a pilot-opening type check valve to two pressure chambers or a pressure chamber on the cushion pressure production side of the fluid hydraulic cylinder.

11. The die cushion apparatus of a press machine according to claim 1, further comprising an angular velocity detector for detecting a rotational angular velocity of the electric motor, wherein
the control device uses an angular velocity signal that is detected by the angular velocity detector as an angular velocity feedback signal for ensuring dynamic stability of a die cushion pressure.

12. The die cushion apparatus of a press machine according to claim 1, further comprising a die cushion position detector that detects a position of the cushion pad, wherein
the control device uses a die cushion position signal that is detected by the die cushion position detector as a position feedback signal in a case in which a fluid hydraulic cylinder is raised or lowered alone or when performing a product knockout operation.

13. The die cushion apparatus of a press machine according to claim 1, further comprising a slide position detector that detects a slide position of the press machine or an angle detector that detects an angle of a drive shaft of the press machine, wherein
the die cushion pressure command device outputs a die cushion pressure command based on a slide position signal that is detected by the slide position detector or an angle signal that is detected by the angle detector.

14. The die cushion apparatus of a press machine according to claim 1, further comprising a slide speed detector that detects a sliding speed of the press machine or an angular velocity detector that detects an angular velocity of a drive shaft of the press machine, wherein
the control device uses a slide speed signal that is detected by the slide speed detector or an angular velocity signal that is detected by the angular velocity detector in compensation for ensuring dynamic stability in die cushion pressure control.

15. A die cushion apparatus of a press machine, comprising:
a plurality of fluid hydraulic cylinders that support a cushion pad;
a plurality of pressure detectors that detect a pressure of a pressure chamber on a cushion pressure production side of each fluid hydraulic cylinder, respectively;
a plurality of fluid hydraulic pump/motors having a discharge opening that is connected through a first pipe to a pressure chamber on the cushion pressure production side of each fluid hydraulic cylinder;
a plurality of electric motors that are respectively connected to a rotating shaft of each fluid hydraulic pump/motor;
a die cushion pressure command device that outputs a die cushion pressure command that is previously set;
a control device that controls a torque of each electric motor so that a die cushion pressure is a pressure that corresponds to the die cushion pressure command based on the die cushion pressure command and pressures that are detected by the plurality of pressure detectors; and
a regeneration device that regenerates energy required for a die cushioning action that the cushion pad receives when die cushioning of a press machine is effected as electrical energy through the plurality of fluid hydraulic cylinders, fluid hydraulic pump/motors and electric motors.

16. The die cushion apparatus of a press machine according to claim 15, wherein an other discharge opening of the fluid hydraulic pump/motor is connected to a pressure chamber on a descent side of the fluid hydraulic cylinder through a second pipe, and the second pipe is connected with an accumulator that is filled with a liquid of a substantially constant low pressure.

17. The die cushion apparatus of a press machine according to claim 15, wherein
an other discharge opening of the fluid hydraulic pump/motor is connected to a tank through a second pipe.

18. The die cushion apparatus of a press machine according to claim 15, wherein
an other discharge opening of the fluid hydraulic pump/motor is connected to a pressure chamber on a descent side of the fluid hydraulic cylinder through a second pipe without directly communicating with a substantially constant low pressure source comprising one of a tank and an accumulator.

19. The die cushion apparatus of a press machine according to claim 18, further comprising two check valves provided in mutually opposite directions in a third pipe that connects a first pipe that is connected to a pressure chamber on the cushion pressure production side of the fluid hydraulic cylinder and a second pipe that is connected to a pressure chamber on a descent side of the fluid hydraulic cylinder, and
a relief valve is connected to the third pipe between the two check valves such that an abnormal pressure that is produced in a pressure chamber on the cushion pressure production side or a pressure chamber on a descent side of the fluid hydraulic cylinder is released through the relief valve.

20. The die cushion apparatus of a press machine according to claim 15, further comprising a relief valve connected to the first pipe such that an abnormal pressure that is produced in a pressure chamber on the cushion pressure production side of the fluid hydraulic cylinder is released through the relief valve.

21. The die cushion apparatus of a press machine according to claim 20, further comprising an accumulator that is filled with a liquid of a substantially constant low pressure, wherein
the accumulator is connected to a low pressure line of the relief valve and also connected to two pressure chambers or a pressure chamber on the cushion pressure production side of the fluid hydraulic cylinder through one of a check valve and a pilot-opening type check valve.

22. The die cushion apparatus of a press machine according to claim 20, further comprising a tank that is connected to a low pressure line of the relief valve, wherein
a low pressure liquid is discharged with a liquid pressure pump from the tank through one of a check valve and a pilot-opening type check valve to two pressure chambers or a pressure chamber on the cushion pressure production side of the fluid hydraulic cylinder.

23. The die cushion apparatus of a press machine according to claim 15, further comprising an angular velocity detector for detecting a rotational angular velocity of the electric motor, wherein
the control device uses an angular velocity signal that is detected by the angular velocity detector as an angular velocity feedback signal for ensuring dynamic stability of a die cushion pressure.

24. The die cushion apparatus of a press machine according to claim 15, further comprising a die cushion position detector that detects a position of the cushion pad, wherein
the control device uses a die cushion position signal that is detected by the die cushion position detector as a position feedback signal in a case in which a fluid hydraulic cylinder is raised or lowered alone or when performing a product knockout operation.

25. The die cushion apparatus of a press machine according to claim 15, further comprising a slide position detector that detects a slide position of the press machine or an angle detector that detects an angle of a drive shaft of the press machine, wherein
    the die cushion pressure command device outputs a die cushion pressure command based on a slide position signal that is detected by the slide position detector or an angle signal that is detected by the angle detector.

26. The die cushion apparatus of a press machine according to claim 15, further comprising a slide speed detector that detects a sliding speed of the press machine or an angular velocity detector that detects an angular velocity of a drive shaft of the press machine, wherein
    the control device uses a slide speed signal that is detected by the slide speed detector or an angular velocity signal that is detected by the angular velocity detector in compensation for ensuring dynamic stability in die cushion pressure control.

* * * * *